United States Patent
Couleaud et al.

(10) Patent No.: US 12,403,819 B2
(45) Date of Patent: Sep. 2, 2025

(54) SYSTEM AND METHODS TO MODIFY ACTIVE CAR PAINT

(71) Applicant: Adeia Guides Inc., San Jose, CA (US)

(72) Inventors: Jean-Yves Couleaud, Mission Viejo, CA (US); Serhad Doken, Bryn Mawr, PA (US); Ning Xu, Irvine, CA (US)

(73) Assignee: Adeia Guides Inc., San Jose, CA (US)

(*) Notice: Subject to any disclaimer, the term of this patent is extended or adjusted under 35 U.S.C. 154(b) by 35 days.

(21) Appl. No.: 18/244,076

(22) Filed: Sep. 8, 2023

(65) Prior Publication Data

US 2025/0083595 A1 Mar. 13, 2025

(51) Int. Cl.
*B60Q 1/50* (2006.01)
*B60R 25/104* (2013.01)

(52) U.S. Cl.
CPC .............. *B60Q 1/509* (2022.05); *B60Q 1/543* (2022.05); *B60Q 1/545* (2022.05); *B60R 25/104* (2013.01)

(58) Field of Classification Search
CPC ........ B60Q 1/509; B60Q 1/543; B60Q 1/545; B60R 25/104
See application file for complete search history.

(56) References Cited

U.S. PATENT DOCUMENTS

| | | | |
|---|---|---|---|
| 11,654,821 B1* | 5/2023 | Durairaj | B60Q 1/26 701/1 |
| 12,200,078 B1 | 1/2025 | Dasher et al. | |
| 2013/0179035 A1* | 7/2013 | Adachi | B60Q 1/5035 701/36 |
| 2013/0300551 A1* | 11/2013 | Weber | G08G 1/163 340/435 |
| 2018/0322712 A1* | 11/2018 | Salter | G09F 13/22 |
| 2020/0005361 A1 | 1/2020 | Zeiger et al. | |
| 2020/0130575 A1* | 4/2020 | Iwano | B60Q 3/80 |
| 2021/0201355 A1* | 7/2021 | van den Berg | B60W 60/001 |
| 2024/0062656 A1* | 2/2024 | Forscher | G08G 1/163 |
| 2024/0169595 A1 | 5/2024 | Ramirez et al. | |
| 2025/0005084 A1 | 1/2025 | Dasher et al. | |

OTHER PUBLICATIONS

Dent, "LG's MoodUP refrigerator comes with color-changing LED doors and a built-in speaker," (Sep. 1, 2022) (https://www.engadget.com/lg-mood-up-refrigerator-uses-led-panels-to-color-shift-your-kitchen-093402450.html) (3 pages).

(Continued)

*Primary Examiner* — Omeed Alizada
(74) *Attorney, Agent, or Firm* — HALEY GUILIANO LLP

(57) ABSTRACT

Methods and systems are disclosed herein for modifying one or more color changing exterior surfaces of a vehicle in response to identified safety events. Specifically, a safety event is identified in a surrounding environment of a vehicle that comprises one or more color-changing exterior surfaces. In response to the identifying of the safety event, a color scheme is selected for the one or more color-changing exterior surfaces of the vehicle based on the type or safety event and the appearance of the surrounding environment. One or more color changing exterior surfaces of the vehicle are modified to match the selected color scheme.

20 Claims, 16 Drawing Sheets

(56) References Cited

OTHER PUBLICATIONS

DPCcars, "How It Works—Color Changing BMW iX E Ink", DPCcars, "How It Works—Color Changing BMW iX E Ink", (YouTube), Jan. 5, 2022, Retrieved from https://www.youtube.com/watch?v=Dxklo-2Jzzo (5 Pages).
ispot.tv, "2022 Audi Q4 e-tron TV Spot", ISpot. TV, "2022 Audi Q4 e-tron TV Spot, 'Electric Future' [T1]", https://www.ispot.tv/ad/505p/audi-q4-e-tron-electric-future-t1, Jan. 8, 2024 (3 Pages).
Mobilads, "Leading Rideshare Car-wrap Out-of-home Advertiser," (https://www.mobilads.co/) (undated) (8 pages).
Richards, "Adobe Introduces Project Primrose, a Digital Animated Dress That Can Change Patterns," (Oct. 14, 2023) (https://people.com/adobe-debuts-interactive-dress-8358152) (9 Pages).
U.S. Appl. No. 18/427,137, filed Jan. 30, 2024, Jean-Yves Couleaud.
Amazon SQHNGOM Store "2pcs Car Painted Decals, Racing Stripes Side Wrap, Vinyl Stickers, Car Body Stickers (Type 5)," (https://www.amazon.com/Painted-Decals-Racing-Stripes-Stickers/dp/B0BGQGSLLB?th=1)(5 pages).
Anonymous, "Rfleet" (downloaded Jul. 14, 2023) (https://reviver.com/rfleet/).
Anonymous, "A digital licenses plate. But so much more," Reviver, (downloaded Jul. 14, 2023) (https://reviver.com/rplate/).
Antuan Goodwin, "BMW Has a Car That Talks Like KITT and Changes Color to Match Your Outfit" (https://www.cnet.com/roadshow/news/bmw-has-a-car-that-talks-like-kitt-and-changes-color-to-match-your-outfit/)(4 pages).
Ayan Ghosh, "Video: Watch this BMW's thermochromic paint change color when treated to warm water" (Motoroids) (5 pages).
BMX iX Flow (https://www.bmw.com/en/events/ces2022/ixflow.html) (CES 2022)(2 pages).
Byron Hurd, "The most and least popular car colors" https://www.autoblog.com/article/most-least-popular-car-colors/, (Auto Blog)(Feb. 20, 2022) (5 pages).
Chris Constantine, "Extremely Purple, One-Off Mclaren 720S Presented to Wealthy Client at Pebble Beach," (Aug. 18, 2017), (4 pages), (https://www.thedrive.com/article/13622/extremely-purple-one-off-mclaren-720s-presented-to-wealthy-client-at-pebble-beach.
DPCars, "Color Changing BMW i Vision Dee Featuring E Ink" (https://www.youtube.com/watch?v=79dWf3HB2HQ)(1:03)(Uploaded Jan. 5, 2023)(4 pages).
George, "Check out BMW's color-changing concept car in action," Jan. 5, 2023 (https://www.theverge.com/2023/1/5/23540358/bmw-color-changing-car-concept-e-ink-i-vision-dee-ces).
Magdan Daniel,"10 Custom Car Paint Jobs That Will Really Get Your Motor Running," (Hotcars)(7 pages).
Matthew Crisara, "Temperature-Sensitive Paint Makes Audi A4 Look Wild," (https://www.motor1.com/news/483180/temperature-sensitive-paint-audi-a4/) (Jan. 30, 2021)(3 pages).
Navarro et al. "Color-Texture Pattern Classification Using Global-Local Feature Extraction, an SVM Classifier, with Bagging Ensemble Post-Processing"(https://www.mdpi.com/2076-3417/9/15/3130)(Image Processing Laboratory)(8 pages).
Robert Valkenburg et al. "Seamless texture map generation from multiple images"(https://dl.acm.org/doi/10.1145/2425836.2425839)(2 pages).
Samsung Newsroom,"The Safety Truck Could Revolutionize Road Safety," Jun. 18, 2015 (https://news.samsung.com/global/the-safety-truck-could-revolutionize-road-safety.
Simms, "Most Popular Car Colors Over Time . . . Shades of Gray," Daily Infographic (2021) (10 pages) (https://dailyinfographic.com/most-popular-car-colors).
Wikipedia, "ChromaFlair" (https://en.wikipedia.org/wiki/ChromaFlair) (downloaded Sep. 25, 2023)(1 page).
Wikipedia, "Complementary color", (https://simple.wikipedia.org/wiki/Complementary_color) (downloaded Sep. 22, 2023).
Charles Dasher, et al., U.S. Appl. No. 18/215,568, filed Jun. 28, 2023, "Methods and Systems for Configuring a User Device".
Charles Dasher, et al., U.S. Appl. No. 18/215,592, filed Jun. 28, 2023, "Methods and Systems for Configuring a User Device".

\* cited by examiner

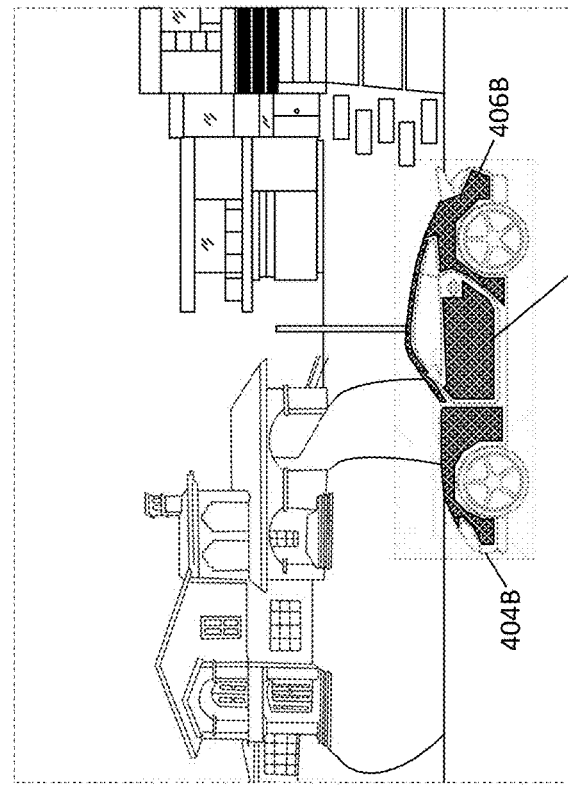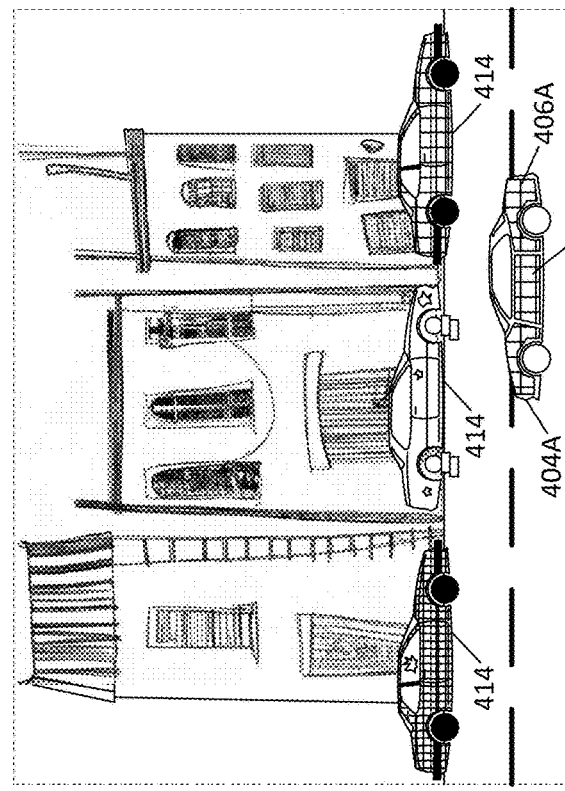
FIG. 4A
FIG. 4B

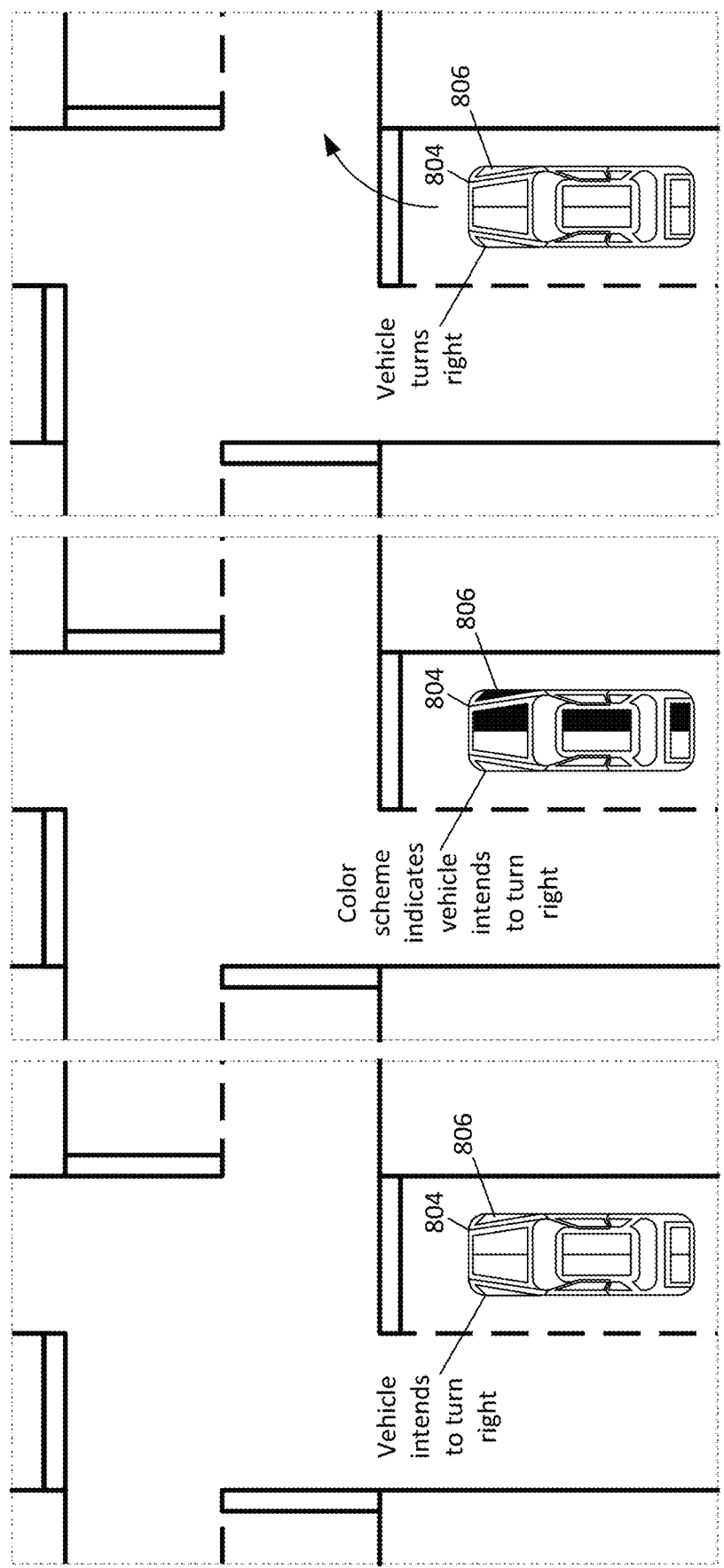

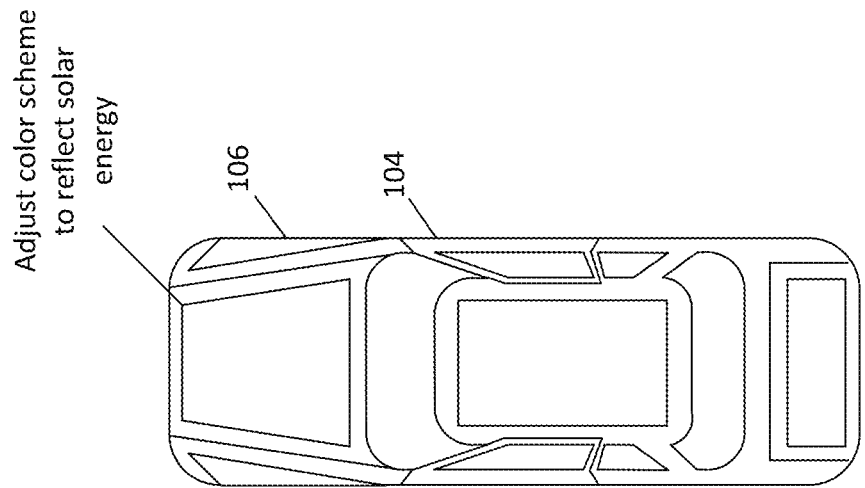
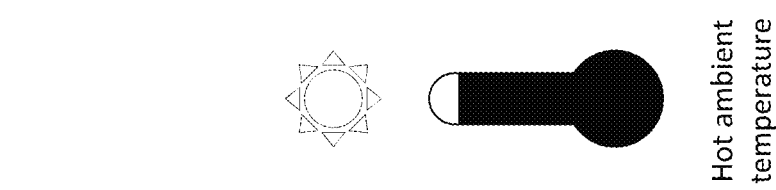
FIG. 9B
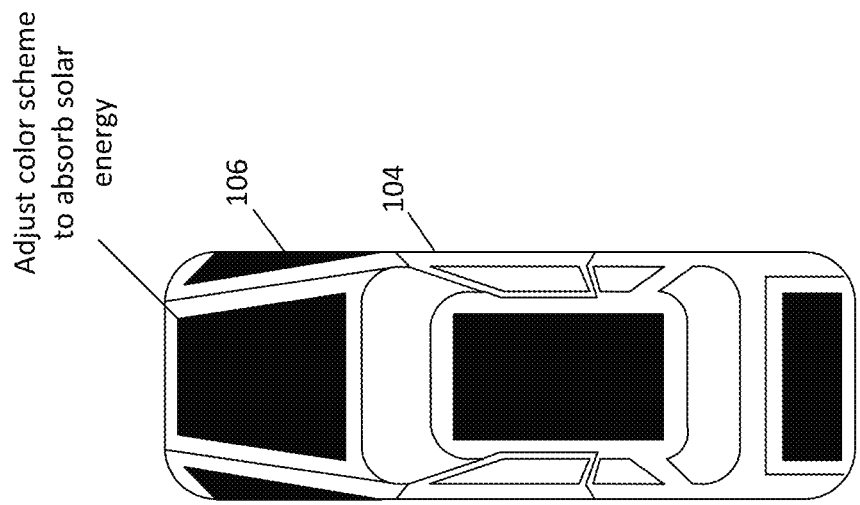
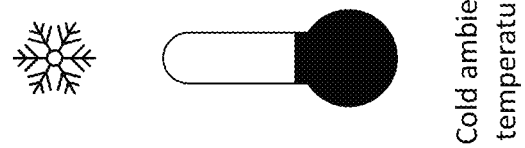
FIG. 9A

SYSTEM AND METHODS TO MODIFY ACTIVE CAR PAINT

BACKGROUND

This disclosure describes at least systems and methods for modifying a color-changing exterior surface of a vehicle.

SUMMARY

Vehicles are subjected to diverse scenarios and driving conditions, including different types of safety events. For example, vehicles may be subjected to driving in bad weather, potential collisions with other objects, and a need to identify the vehicle amongst other vehicles. The visibility of a vehicle may impact what happens to the vehicle as a result of the safety event. For some safety events, it may be advantageous for the vehicle to stand out from the surrounding environment. When the visibility of the surrounding environment is reduced, it may be difficult for others to see the vehicle. When the vehicle is stolen, it may be challenging to identify the vehicle amongst surrounding vehicles. For other safety events, such as driving through an area known to be high in crime, blending in with the surrounding environment may be beneficial.

Solving this problem is difficult because vehicles have limited means to signal their presence to nearby people, such as pedestrians and other drivers. Exterior lights, such as headlights, blinkers, and taillights, can alert others to the presence of the vehicle. However, these lights are displayed on a limited portion of the vehicle and may go unnoticed, such as in low visibility conditions or by distracted drivers. Increasing the size or quantity of the lights may increase the visibility of the vehicle, but such a solution presents an aesthetic that may not be desired by consumers and may also distract nearby people. Further, most vehicles are manufactured with an exterior color of black, white, or grey. While these colors may increase the visibility of the vehicle in some conditions, such as a black car in snow or a white car at night, they are less effective in other conditions, such as a black car at night or a white car in snow. Thus, a means for modifying the visibility of vehicles based on a type of safety event and the surrounding environment is needed.

In one approach, a custom paint job may be applied to a vehicle after manufacture. One of several different solid colors, including high-visibility colors, may be selected and applied to the vehicle. However, the vehicle painting process requires specialty training and is labor intensive since the car was previously painted and assembled. The entire car must be sanded to remove the original paint and cleaned to remove dust and oil. Trim pieces and vehicle components, such as doors, must be removed. Several areas of the vehicle, such as the windows, must be masked so the paint does not end up in unwanted areas. Several coats of primer and paint must be applied. Each coat may be sanded and cleaned before applying a subsequent coat. A clear coat may be applied after the paint, and touch-up work may be required. While this approach provides an exterior color that may increase the visibility of the vehicle in certain scenarios, the exterior color is static and may not provide a visibility that is appropriate for some types of safety events.

In another approach, decals or sticker wraps (collectively referred to as "wraps") may be used to change the exterior color of a vehicle. Such an approach is simpler than applying custom paint and may even be performed without specialty training. Wraps having colors or patterns that stand out from or blend into a surrounding environment may be applied. The wraps may be removed using heat and an adhesive remover, making it easier to change the exterior color of the vehicle compared to using paint. While this provides a means to change the visibility of the vehicle, it presents the same challenges as custom paint jobs since the decal or sticker wraps cannot be changed without a notable amount of effort.

In another approach, a custom paint or wrap type (collectively referred to as "coating type") that changes color may be applied to the vehicle. In one example, a coating may change color depending on the angle from which the exterior of the vehicle is viewed. In another example, a heat-sensitive coating may change based on the temperature of the surface on which the paint is applied. In another example, an electroluminescent coating may appear as one color, but light up or illuminate as a different color in response to an electrical current. While this approach offers a means to change the visibility, it does not provide a visibility that is appropriate for some types of safety events.

In another approach, a color-changing coating may be applied to the vehicle that includes microcontainers, such as microcapsules, containing pigment particles of different colors suspended in a clear fluid. Electric fields are applied to the color-changing coating to change its color. A different electric field may be applied to each microcontainer to rearrange the pigment particles contained within and change the color presented by the microcontainer. The color of the color-changing layer is based on the color of the microcontainers. While this approach provides a means of changing the color of the vehicle exterior, it does not provide a means for modifying the visibility of vehicles based on a type of safety event and the surrounding environment.

Accordingly, there is a need to provide automatic control of the exterior color of a vehicle based on a type of safety event and the environment surrounding the vehicle. Such a solution leverages the ability to change the color of the vehicle's exterior.

To solve these problems, systems and methods are provided herein for modifying the visibility of a vehicle in response to the safety event.

In one approach, a safety event is identified in an environment surrounding the vehicle, which is referred to as the "surrounding environment." The vehicle includes one or more color-changing exterior surfaces. A color scheme for the one or more exterior surfaces is selected in response to identifying the safety event. The color scheme is selected based on different factors, including the type of safety event and the appearance of the surrounding environment. One or more color-changing exterior surfaces of the vehicle are modified to match the selected color scheme.

In some embodiments, the identifying the safety event includes identifying there is low visibility in the surrounding environment. A color scheme is selected that includes a color that is high contrast to the surrounding environment, and thus stands out from the surrounding environment such that an onlooker could easily notice the vehicle. The high contrast color may include complementary color combinations, split complementary color combinations, and triadic color combinations to the surrounding environment. High-contrast complementary color combinations may include white on black, black on yellow, yellow on black, green on black, yellow on blue, and blue on yellow, to name a few examples.

The color may be selected by selecting the color properties, such as hue, saturation, and luminance (HSL). Hue may be the actual color, such as the colors of a color wheel. Saturation may be an indicator of the intensity of the selected hue. Luminance may be a measure to describe the perceived brightness of the selected hue. In some embodiments, a color scheme other than HSL may be used.

In some embodiments, the identifying the safety event includes receiving a report that the vehicle has been stolen. For example, an owner of the vehicle may indicate that the vehicle has been stolen. A color scheme is selected that includes a color that is high contrast to surrounding vehicles and surrounding environments. The color scheme allows onlookers, including law enforcement, to easily notice the vehicle.

In some embodiments, the identifying the safety event includes identifying there is snow in the surrounding environment. A color scheme is selected that includes a color that is high contrast to the snow to allow the vehicle to stand out.

In some embodiments, the identifying the safety event includes identifying the vehicle is changing a navigational property. For example, the vehicle may be changing lanes, turning, braking, or coming to a stop. A dynamic color scheme is selected that includes a color that changes over time. The dynamic color scheme may alternate between at least two colors to increase awareness of the vehicle's action.

In one example, the vehicle may include multiple color-changing exterior surfaces that are positioned on both the driver and passenger sides of the vehicle. If the vehicle is turning right, then the dynamic color-changing scheme is applied to the color-changing exterior surfaces on the passenger side of the vehicle. In another example, if the vehicle is braking, then the dynamic color-changing scheme is applied to color-changing exterior surfaces on the rear of the vehicle.

In some embodiments, the identifying the safety event includes identifying a nearby vehicle is positioned within a proximity threshold of the vehicle. A dynamic color scheme is selected that includes a color that changes with the distance between the nearby vehicle and the vehicle. For example, as the nearby vehicle is within the proximity threshold the color scheme changes to a high contrast hue. As the nearby vehicle gets closer to the vehicle, the saturation or luminosity of the hue change, such as by increasing the corresponding value. As the nearby vehicle gets away from the vehicle, but remains inside the proximity threshold, the value of the saturation or luminosity decreases.

In some embodiments, the identifying the safety event comprises identifying the vehicle is within a geofence around a high crime area. While in the high crime area, it may be advantageous for the vehicle to blend in with surrounding vehicles to prevent unwanted attention. A color scheme is selected based on the exterior color of the surrounding vehicles located within the geofence.

In another approach, other vehicles surrounding the vehicle, which are referred to as the "surrounding vehicles," include one or more color-changing exterior surfaces.

In some embodiments, a color scheme of the surrounding vehicles is selected to stand out from the exterior color of the vehicle, such as when the vehicle is reported stolen. In one example, the color scheme of the surrounding vehicles may include colors that contrast to the colors of the vehicle.

In some embodiments, a color scheme is selected for a "main vehicle" to distinguish it from the "dependent" surrounding vehicles. In some cases, this is because the main vehicle is in more danger than the vehicles surrounding it given a safety event, or because the safety event is related to the vehicle (e.g., the vehicle is out of control or suffering from a mechanical failure that puts the surrounding vehicles at risk). In some embodiments, a separate color scheme which contrasts the color scheme selected for the main vehicle is selected for the dependent vehicles, to further distinguish the main vehicle from the surrounding, dependent vehicles.

In another approach, a plurality of vehicles each have one or more color-changing surfaces. In some embodiments, the same color scheme is selected for all of the plurality of vehicles. In some embodiments, the color scheme of each vehicle of the plurality of vehicles includes a color that is harmonious with the color of the other vehicles. In one example, the color scheme of the vehicles includes colors that are analogous color combinations or monochromatic color combinations. In some embodiments, the color scheme of each vehicle of the plurality of vehicles includes a color that contrasts with the color of the other vehicles.

In another approach, the ambient temperature is identified. The color scheme of the vehicle is selected in response to the identifying the ambient temperature. For example, if the ambient threshold is considered hot, then the color scheme includes lighter colors, such as white or different tints of colors. The lighter colors may reflect solar energy and cool the inside of the vehicle. If the ambient threshold is considered cold, then the color scheme includes darker colors, such as black or different shades of colors. The darker colors may absorb solar energy and warm the inside of the vehicle.

In another approach, a time and location of the vehicle is determined while the color-changing surface is active. The time and location are linked to the color scheme such that the location and exterior color may be identified for a given time. This may help law enforcement determine if the vehicle was an accessory to a crime.

In another approach, a color scheme of an article of clothing is identified. The color scheme of the vehicle is selected to match the color scheme of the article of clothing. In some embodiments, the color scheme of the vehicle includes a color that is harmonious with the color scheme of the article of clothing. In some embodiments, a pattern, rather than a color scheme, may be selected to match the pattern displayed on the article of clothing. In some approaches, the pattern may comprise patterns of colors. In some implementations, the color changing exterior surfaces display a dynamic pattern, in which the pattern visually moves across the various color changing exterior surfaces of the vehicle.

Using the methods described herein, the visibility of a vehicle may be adjusted in response to a safety event. A color scheme for the exterior of the vehicle is selected based on the type of safety event and the appearance of the surrounding environment. For some safety events, the color scheme stands out from the surrounding environment. For other safety events, the color scheme blends in with the surrounding environment. It also must be noted that the techniques of FIGS. 1-9 may be implemented in combination with one another by leveraging multiple color-changing exterior surfaces. As an example, control circuitry may select dynamic color-changing scheme to be applied on the color-changing exterior surfaces on the passenger side of the vehicle to indicate that the vehicle is turning right while simultaneously selecting a color scheme which stands out from the surrounding environment to be displayed on the vehicle's other color-changing exterior surfaces.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 4A and 4B are schematic illustrations of modifying a color-changing exterior surface of a vehicle in response to the vehicle being within a geofence, in accordance with embodiments of the disclosure;

FIGS. 8A-8C are schematic illustrations of modifying a color-changing exterior surface of a vehicle to communicate the driver's intent, in accordance with embodiments of the disclosure;

FIGS. 9A and 9B are schematic illustrations of modifying a color-changing exterior surface of a vehicle in response to an ambient temperature, in accordance with embodiments of the disclosure;

DETAILED DESCRIPTION

As referred to herein, the phrase "surrounding environment" refers to the environment surrounding a vehicle. In some embodiments, the surrounding environment is defined by the surroundings within a line of sight of the vehicle. In some embodiments, the surrounding environment is defined by the surroundings within a fixed distance of the vehicle. In some embodiments, the surrounding environment is defined by a distance the vehicle may travel in a certain amount of time based on its velocity.

As referred to herein, the phrase "safety event" refers to any event where the visibility of the vehicle impacts the safety of the vehicle or its passengers, or the safety of the vehicle's surroundings. Safety events may include scenarios when the surrounding environment has an illuminance that impairs the ability to visually see the vehicle, such in direct sunlight, at dusk or dawn, or at night. Safety events may include low visibility scenarios when the vehicle is not visible beyond certain distances, such as when there is fog, rain, or snow in the surrounding environment. Safety events may include scenarios where the location of the vehicle may affect the safety, such as when in high-crime areas, high-traffic areas, heavy pedestrian traffic areas, or remote areas. Safety events may include scenarios where the probability and impact of the safety event are notable, such as when a nearby vehicle is traveling too close to the vehicle or when the vehicle is maneuvering amongst other vehicles. Safety events may include in-cabin scenarios that affect a driver's operational readiness or put surrounding vehicles in danger, such as a driver of the vehicle having a medical emergency or falling asleep. Safety events may include vehicle internal system failures, such as battery issues or malfunctioning brakes.

Figure 1:
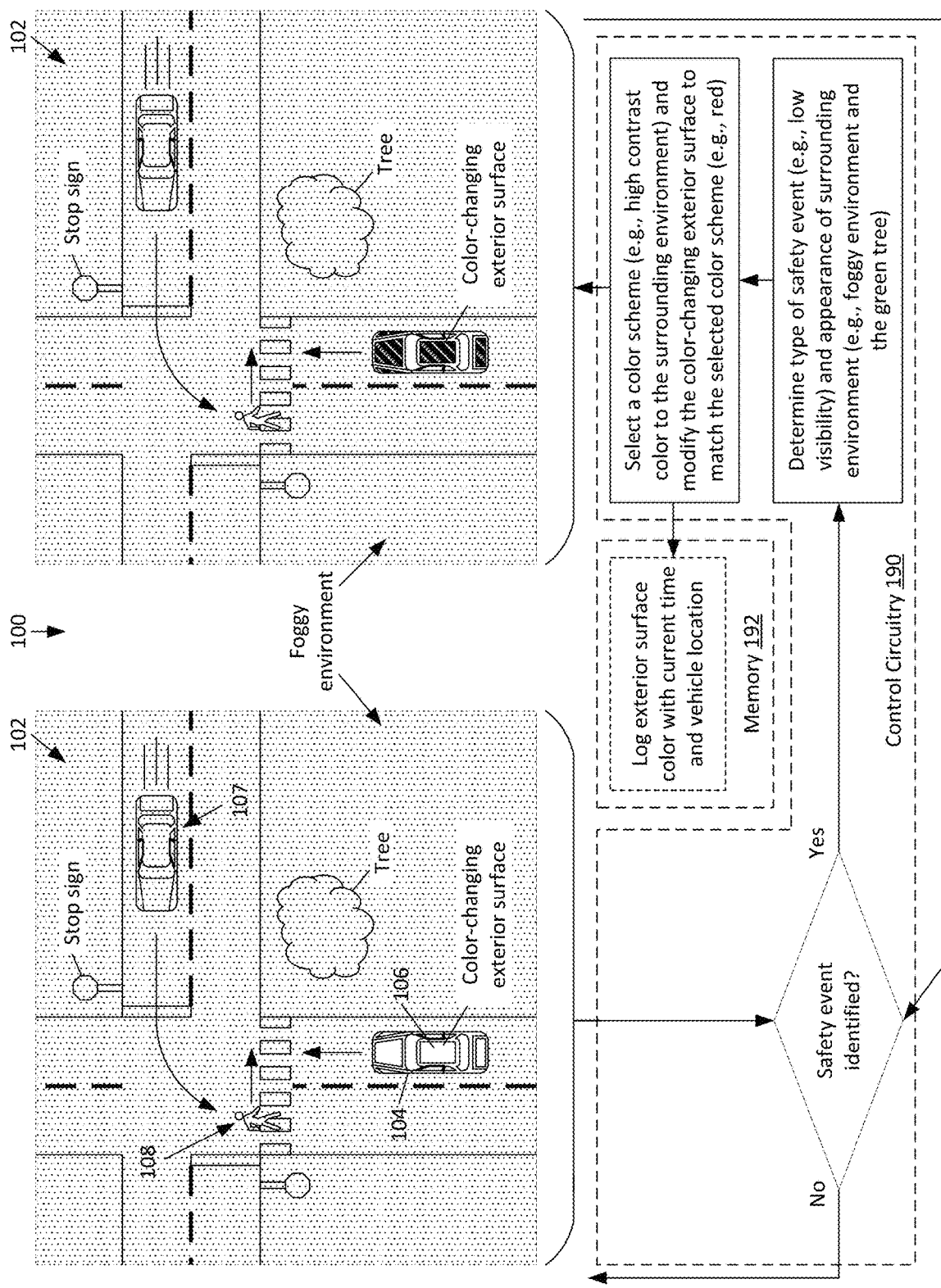
FIG. 1 is a schematic illustration of modifying a color-changing exterior surface of a vehicle in response to a safety event, in accordance with embodiments of the disclosure.

FIG. 1 is a schematic illustration of modifying a color-changing exterior surface 106 of a vehicle 104 in response to a safety event, in accordance with embodiments of the disclosure.

Control circuitry 190 may execute a visibility adjustment system 100, which identifies the safety event and selects a color scheme for the exterior surface of the vehicle 104. The selected color scheme changes the visibility of the vehicle 104, and is selected based on the type of safety event and the appearance of a surrounding environment 102. The selected color scheme is applied to the color-changing exterior surface 106, which are coupled to, or integral with, the exterior surface of the vehicle 104.

The visibility adjustment system 100 includes the color-changing exterior surface 106, control circuitry 190, and memory 192. The control circuitry 190 and memory 192 reside in or on the vehicle 104. The visibility adjustment system 100 includes several applications to control the color of the color-changing exterior surface 106. For example, control circuitry 190, by running the visibility adjustment system 100, processes computer-executable instructions to coordinate selection of a color scheme and modifies the color-changing exterior surface 106 to match the selected color scheme.

The instructions may be provided by control circuitry 190 through input/output (I/O) circuitry (e.g., I/O path 1212, discussed below in relation to FIG. 12). The visibility adjustment application executes on the control circuitry 190. The control circuitry 190 also executes a safety event classification application, such as discussed in relation to FIGS. 12 and 13, to identify the type of safety event. The safety event classification application executes on the control circuitry 190 to minimize latency. The control circuitry 190 also executes an environmental analysis application, such as discussed in relation to FIGS. 12 and 13, to identify the appearance of the surrounding environment.

The control circuitry 190 may use one or more cameras and one or more sensors to monitor the surrounding environment and determine the type of safety event. Sensors may include any of positional sensors, light sensors, distance sensors, proximity sensors, temperature sensors, humidity sensors, visibility sensors, rain sensors, global positioning system (GPS) beacons, inertial measurement units (IMUs), transceivers, sonar, radar, lidar, lasers, accelerometers, and gyrometers. The control circuitry 190 processes the images captured by the cameras and/or data captured by the sensors. The environmental analysis application executed by control circuitry 190, which may use a trained machine learning model (e.g., a convolutional neural network), uses the captured images and sensor data to determine the appearance of the surrounding environment. For example, the machine learning model may be trained to identify any of low light or overly bright conditions, low visibility conditions, a location of the vehicle, proximity to surrounding objects, and trajectory of surrounding objects using the captured images and/or sensor data. Control circuitry 190, by running the safety event classification application, uses the appearance of the surrounding environment to determine the type of safety event. In some embodiments, separate trained machine learning models are used for camera data and sensor data. In some embodiments, separate trained machine learning models are be used for different sensor data.

In the embodiment depicted in FIG. 1, the surrounding environment includes an intersection with two-way stop signs. The vehicle 104 is traveling straight on a street that does not have stop signs. A pedestrian is crossing the same street on which the vehicle 104 is driving and will cross the path of the vehicle 104. Another vehicle is driving on the intersecting street and approaching one of the two-way stop signs at a fast speed. The other vehicle is positioned to the right of the vehicle 104 and intends to make a left turn that crosses the path of the vehicle 104. A dense fog fills the surrounding environment 102, reducing the visibility. A green tree is positioned within a line of sight between the vehicle 102 and the other vehicle.

The control circuitry 190 may decide whether a safety event is identified. If there is no safety event, the control circuitry 190 continues to check for safety events. If a safety event is identified, then the type of safety event and appearance of the surrounding environment are determined. In the depicted embodiment, the fog creates a low visibility safety event. The control circuitry 190 selects a high-contrast color scheme and modifies the color-changing exterior surface 106 of the vehicle 104 to match the color scheme. In the depicted embodiment, the color scheme includes a red color to stand out from the white fog and green tree. Optionally, the color scheme is saved to the memory 192, such as to a database in the memory, with a timestamp and location of the vehicle 104. This information may be saved to the memory at a predetermined frequency, or based on movement of the vehicle (e.g., more entries if the vehicle is moving faster).

In some embodiments, color-changing exterior panels 106 may cover a portion of the vehicle exterior. In some embodiments, color-changing exterior panels 106 may cover the entire vehicle exterior. In some embodiments a single color-changing exterior panel 106 may cover an exterior component, such as a door. In some embodiments, multiple color-changing exterior panels 106 may cover an exterior component. In some approaches, each of the multiple color-changing exterior panels 106 is independently controlled by the active car paint controller (e.g., active car paint controller 1203, shown in FIG. 12).

Figure 2:
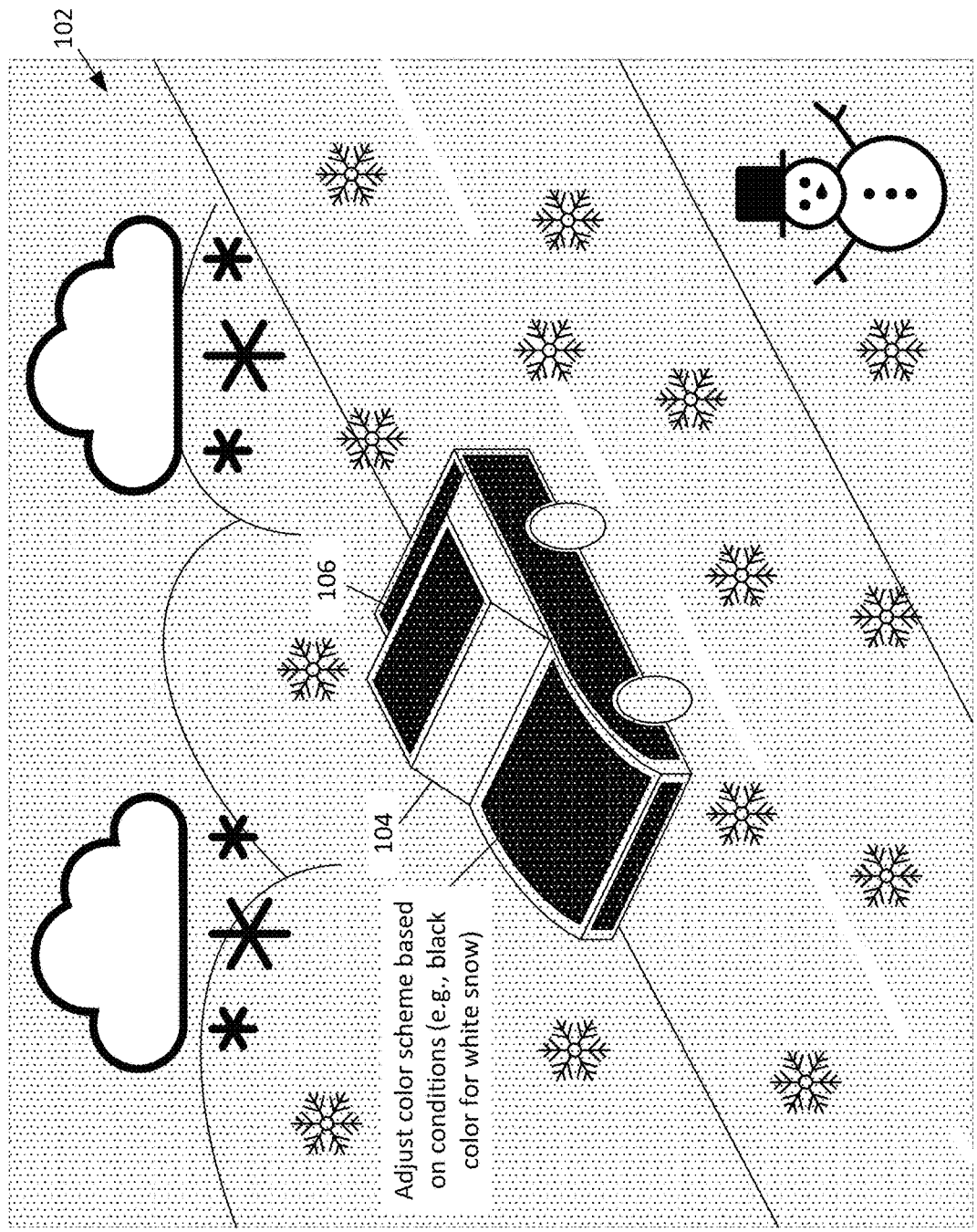
FIG. 2 is a schematic illustration of modifying a color-changing exterior surface of a vehicle in response to snow in a surrounding environment, in accordance with embodiments of the disclosure.

FIG. 2 is a schematic illustration of modifying the color-changing exterior surface 106 of the vehicle 104 in response to snow in a surrounding environment, in accordance with embodiments of the disclosure.

The vehicle 104 is driving down a two-lane road with a dashed line separating the vehicle from a lane of oncoming traffic. The environment surrounding the vehicle 104 includes snow falling and snow on the road and ground. A visibility adjustment system (e.g., visibility adjustment system 100 in FIG. 1) determines the surrounding environment 102 has a predominantly white appearance and that the type of safety event includes low visibility from the snowfall. The safety event may also include overly bright conditions from the snowfall. The visibility adjustment system selects a color scheme having a high contrast color in relation to the white snow, such as black, and modifies the color-changing exterior panels 106 to match the selected color scheme.

In some embodiments, a different high-contrast color is selected for the color scheme. For example, if the surrounding environment includes trees, which have a dark appearance, a color scheme having a fluorescent orange color may be selected.

Figure 3B:
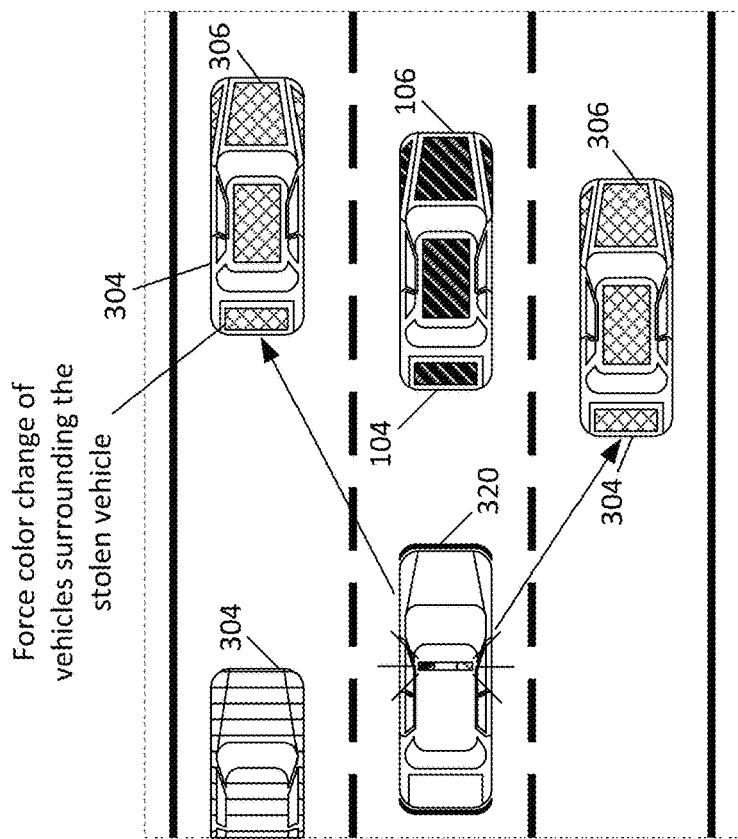
FIG. 3B is a schematic illustration of modifying a color-changing exterior surface of surrounding vehicles in response to theft of the vehicle, in accordance with embodiments of the disclosure.
Figure 3A:
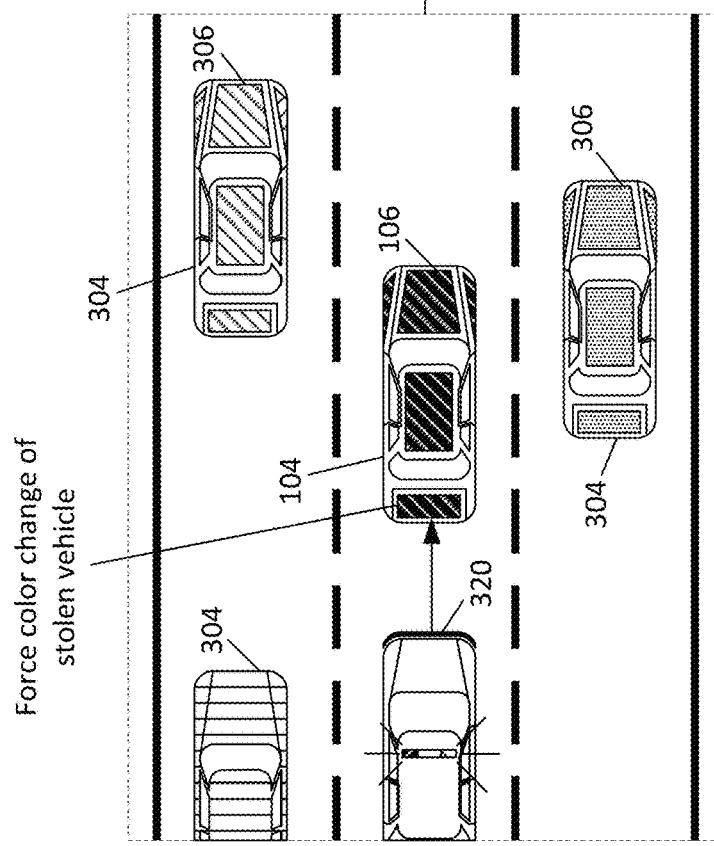
FIG. 3A is a schematic illustration of modifying a color-changing exterior surface of a vehicle in response to theft of the vehicle, in accordance with embodiments of the disclosure.

FIG. 3A is a schematic illustration of modifying the color-changing exterior surface 106 of the vehicle 104 in response to theft of the vehicle 104, in accordance with embodiments of the disclosure.

The vehicle 104 is driving on a multi-lane highway amongst surrounding vehicles 304. A portion of the surrounding vehicles 304 has a color-changing exterior surface 306, which is similar to the color-changing exterior surface 106. The color-changing exterior surface 306 of each surrounding vehicle 304 has a color scheme. The vehicle 104 has been reported stolen and a police car 320 is pursuing the vehicle 104. Upon receiving a report that the vehicle 104 is stolen, control circuitry, by running a visibility adjustment system (e.g., visibility adjustment system 100 in FIG. 1) determines the highway is a dark color, the surrounding vehicle 304 without the color-changing exterior surface 306 is white, the color-changing exterior surfaces 306 are red and black, and the sky is blue. The visibility adjustment system determines the vehicle 104 should stand out to help others notice the vehicle 104 since it is stolen, and selects a color scheme having a color that is high contrast to the surrounding environment. The color scheme includes yellow, which is a color that contrasts the dark road and is a triadic color combination with to blue sky and red color-changing exterior surface 306.

In some embodiments, an owner or driver of the vehicle 104 may report the vehicle 104 as stolen. The report may be received by a visibility adjustment application and though I/O circuitry, such as discussed in relation to FIG. 1. In some embodiments, law enforcement, such as the police car 320, report the vehicle 104 as stolen. In some embodiments, a color override device (e.g., color override device 1209, shown in FIG. 12) associated with the stolen vehicle 104 may, following a command from police car 320, modify color-changing exterior surface 106 to a high contrast color that distinguishes the car from its surroundings.

FIG. 3B is a schematic illustration of modifying the color-changing exterior surface 306 of the surrounding vehicles 304 in response to the theft of the vehicle 104, in accordance with embodiments of the disclosure.

In the embodiment depicted in FIG. 3B, the color-changing exterior surface 106 of the vehicle 104 has been modified as discussed in relation to FIG. 3A. The color-changing exterior surfaces 306 of the vehicles 304 are modified to cause the vehicle 104 to further stand out. For example, a color scheme that includes violet, which is a contrasting color to red, or includes a neutral color such as white, grey, brown, or black, which are muted against red, may be selected and applied to the color-changing exterior surfaces 306. In some approaches, a color override device associated with each of the surrounding vehicles 304 may, following a command from police car 320, force a color change of each of the color changing exterior surfaces 306 to a low contrast color that allows police car 320 to distinguish the stolen vehicle 104 from the surrounding vehicles 304.

In some embodiments, the vehicle 104 may not have a color-changing exterior surface 106. In other situations, the vehicle 104 may have a color changing exterior surface 106; however, a thief may, in an attempt to evade law enforcement, disable the color override capability of the color changing exterior surface 106, thus disabling law enforcement's ability to force a color change of color changing exterior surface 106. In such embodiments, the color-changing exterior surface 306 of the surrounding vehicles 304 may be modified with a color scheme having colors that either blend in with the surrounding environment or cause the vehicle 104 to stand out in relation to the vehicles 304.

FIGS. 4A and 4B are schematic illustrations of modifying a color-changing exterior surface 406 of a vehicle (e.g., vehicle 404A or vehicle 404B) in response to the vehicle being within a geofence (e.g., geofence 422A or 422B), in accordance with embodiments of the disclosure.

FIG. 4A shows the geofence 422A surrounding a high-crime area. The vehicle 404A is driving down a road within the geofence 422A. The vehicle 404A has a color-adjusting exterior surface 406A. A visibility adjustment system (e.g., visibility adjustment system 100 in FIG. 1) identifies the vehicle 404A is within the geofence 422A, such as by using data received from a GPS beacon, and determines the vehicle should blend in with surrounding vehicles 414 within the geofence 422A. A color scheme is selected based on the surrounding vehicles 404 and includes a color that matches or harmonizes with the surrounding vehicles 414. The selected color scheme is applied to the color-adjusting exterior surface 406A.

FIG. 4B shows the geofence 422B surrounding an affluent area. The vehicle 404B is a sports car and includes a color-adjusting exterior surface 406B. The vehicle 404B is located within the geofence 422B, and the visibility adjustment system determines the vehicle 422B should stand out from the surrounding environment. A color scheme that includes a lime green color is selected and applied to the color-adjusting exterior surface 406B.

In some embodiments, a geofence may be used to restrict colors or patterns within a private community. For example, a pre-approved selection of color schemes may be available within certain geofences.

Figure 5A:
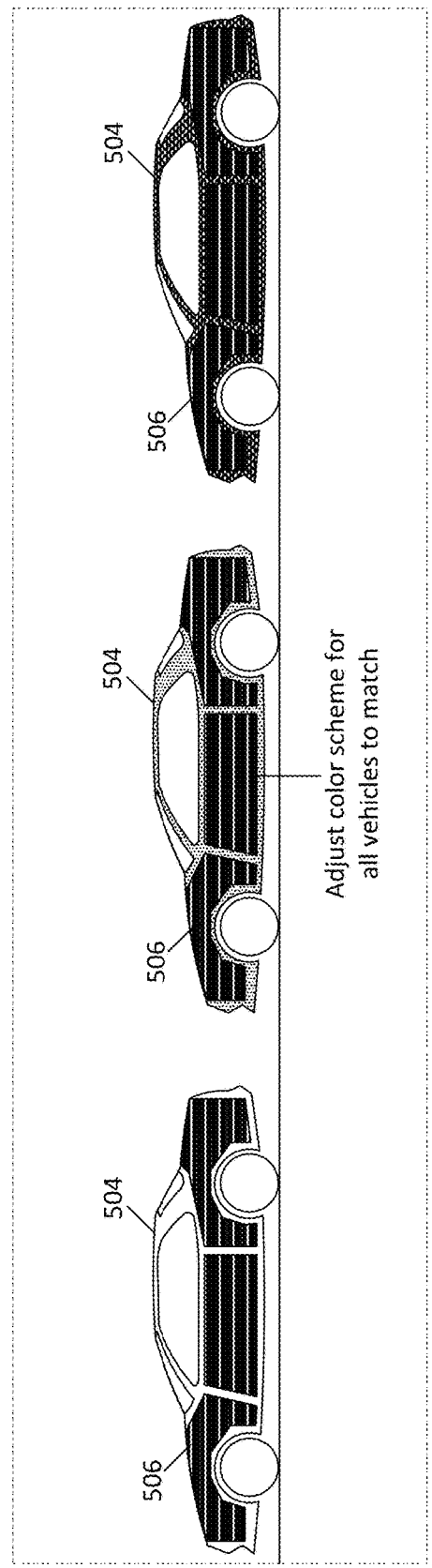
FIGS. 5A and 5B are schematic illustrations of modifying a color-changing exterior surface of a plurality of vehicles, in accordance with embodiments of the disclosure.
Figure 5B:
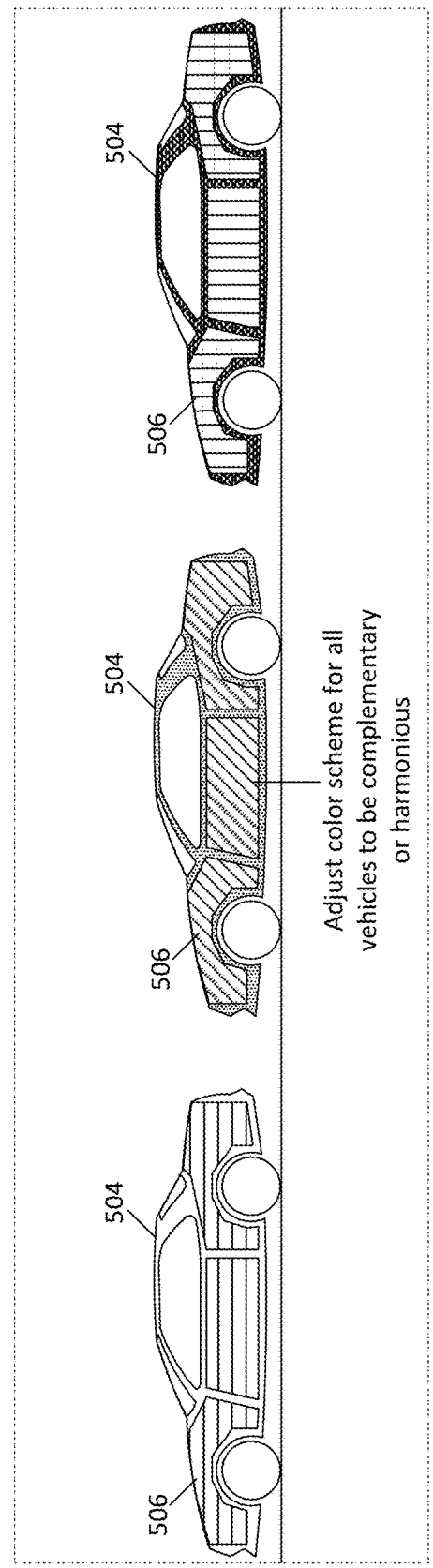

FIGS. 5A and 5B are schematic illustrations of modifying a color-changing exterior surface 506 of a plurality of vehicles 504, in accordance with embodiments of the disclosure.

Referring to FIG. 5A, three vehicles 504 are shown in a line, such as in a funeral procession. A color scheme is selected for the vehicles 504, such as black. The color scheme is applied to the color-changing exterior surfaces 506 of the vehicles 504 such that the exterior color of the vehicles match one another.

Referring to FIG. 5B, three vehicles are shown in a line, such as in a parade or convoy. A color scheme is selected for the vehicles 504 such that the exterior color of each vehicle is different from one another. Together, the exterior colors form either a contrasting or a harmonious color scheme. For example, a contrasting color scheme may include a triadic color combination. A harmonious color scheme may include either an analogous or a monochromatic color combination.

Figure 6A:
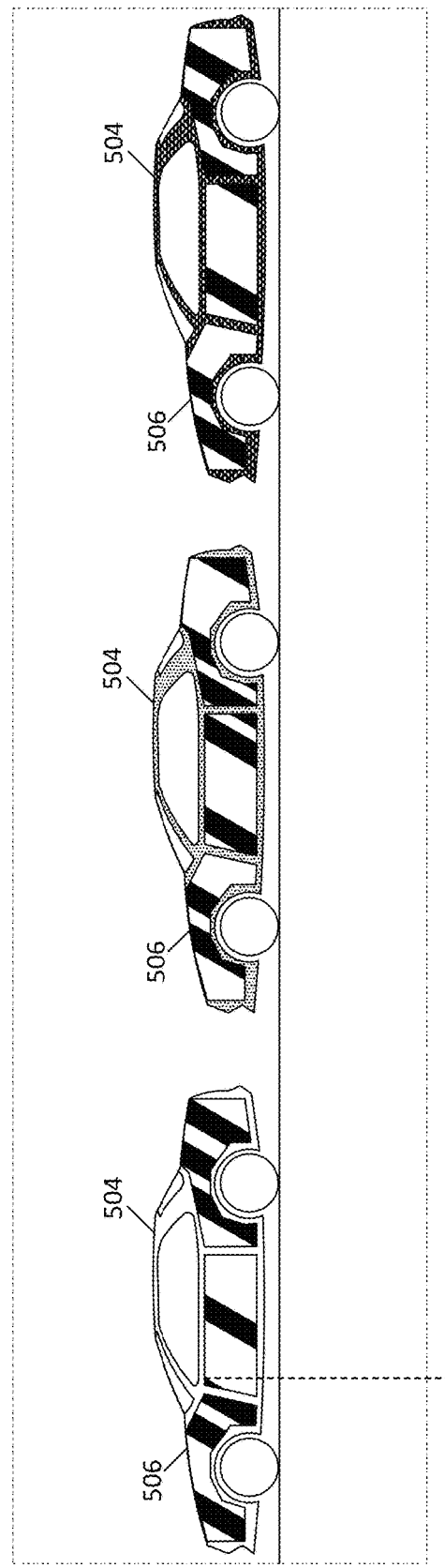
FIGS. 6A and 6B are schematic illustrations of modifying a color-changing exterior surface of a plurality of vehicles to match a dynamic color scheme, in accordance with embodiments of the disclosure.
Figure 6B:
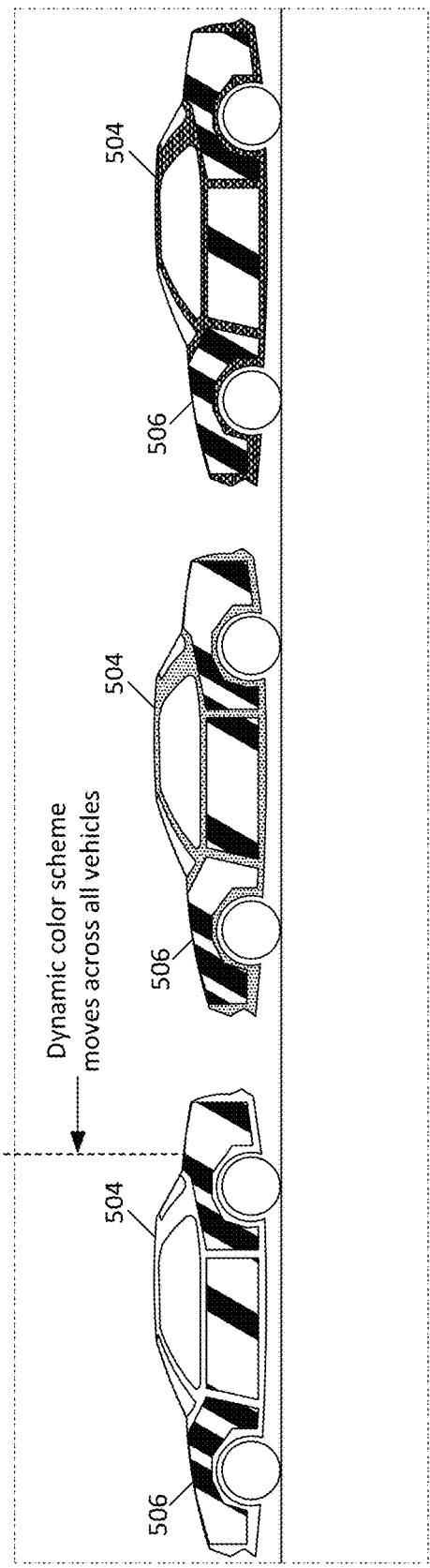

FIGS. 6A and 6B are schematic illustrations of modifying the color-changing exterior surfaces 506 of the plurality of vehicles 504 to match a dynamic color scheme, in accordance with embodiments of the disclosure. FIGS. 6A and 6B are shown at two different points in time and are herein described together for clarity.

The color scheme is a dynamic color scheme that changes over time. In the depicted embodiment, the color scheme includes a pattern of diagonal stripes in a repeating sequence of 1-2-1-3, where the numbers are the number of stripes in a cluster and the dash "-" is a space between the clusters. The dynamic color scheme spans the color-changing exterior surfaces 506 of the vehicles 504. The pattern of diagonal stripes moves to the right (as shown on the page) in a direction towards the rear of the vehicles 504. In the embodiment depicted in FIGS. 6A and 6B, a dashed line shows the movement of a two-stripe cluster between the two different points in time.

In some embodiments, given a safety event, a vehicle may be in more danger than the vehicles surrounding it. Similarly, in other embodiments, the safety event is related to the vehicle, and puts any surrounding vehicles in danger. For example, the vehicle may be out of control, or suffer from a mechanical failure such as malfunctioning brakes or low tire pressure and thus high blowout risk. In some cases, the safety event is related to the driver of the vehicle being incapacitated; in such situations, control circuitry detects that the driver of the vehicle is sleeping or suffering from a medical emergency using cabin cameras. In these situations, there is a need to distinguish the vehicle that either is in more danger or comprises a danger to its surroundings from the surrounding vehicles. As such, in some implementations, in response to identifying the safety event, control circuitry selects a main color scheme for the vehicle in danger, and a dependent color scheme for the surrounding vehicles. In some approaches, control circuitry sends the selected dependent color scheme to the surrounding vehicles via a network (e.g., a V2V network, such as communications network 1301). In some approaches, control circuitry may select main and dependent color schemes that are continuous in that they span and move in relation to, the vehicle and the surrounding vehicles.

Vehicle occupants may also wish to synchronize the color changing exterior surface of their vehicle with the color changing exterior surfaces of vehicles owned by others within a social circle. As an example, supporters of the same football team may wish to display the colors of their team on game day. As such, in some implementations, a user can choose to match the color changing exterior surface of their vehicle to other vehicles which are not within their direct vicinity. In some embodiments, a communications network, such as a V2V network, is used to transfer an active paint configuration from one vehicle to another, or to identify an active paint configuration so that it can be downloaded from an external library of configurations.

In some embodiments, the external library of configurations functions as a car paint marketplace, where custom-designed active paint configurations may be bought and sold. The car paint marketplace may be implemented as part of a vehicle content interface such that users may interact with it using a user input interface (e.g., user input interface 1201, shown in FIG. 12), or as part of an external application implemented on a user equipment device such as a smartphone. Control circuitry accesses the external library of configurations, or the car paint marketplace, over a network (e.g., communications network 1301).

In some approaches, the car paint marketplace identifies trending patterns or color schemes which are available for download or for purchase, thus enabling users to keep up with the latest trends and match color schemes or patterns with others. In some implementations, the user creates a user profile associated with the car paint marketplace which stores information associated with the user such as viewing history, past purchases/downloads, user interests, and vehicle information (e.g., vehicle model, or color changing exterior surface details). The user profile may, in some cases, be associated with more than one vehicle with color-changing exterior functionalities, in which case the car paint marketplace may allow the user to use the same set of downloaded or purchased active car paint configurations for multiple vehicles. The user profile, in some embodiments, saves every color scheme or pattern that the color changing exterior surface has been modified to as well as a determined location of the vehicle associated with each of the color schemes or patterns.

In some approaches, the car paint marketplace comprises a social feature, which allows the user to join an online social circle with a plurality of other users. Each user belonging to the social circle can, via the external library of configurations, select the active car paint configuration information (e.g., color schemes and patterns) of other users within the social circle and apply the selected configuration to their own vehicle's color changing exterior surface to match their friends. Similarly, in some embodiments, the user can connect their social media with the car paint marketplace or with an external library of configurations, allowing them to share their active car paint configurations with others in their social circle.

Figure 7C:
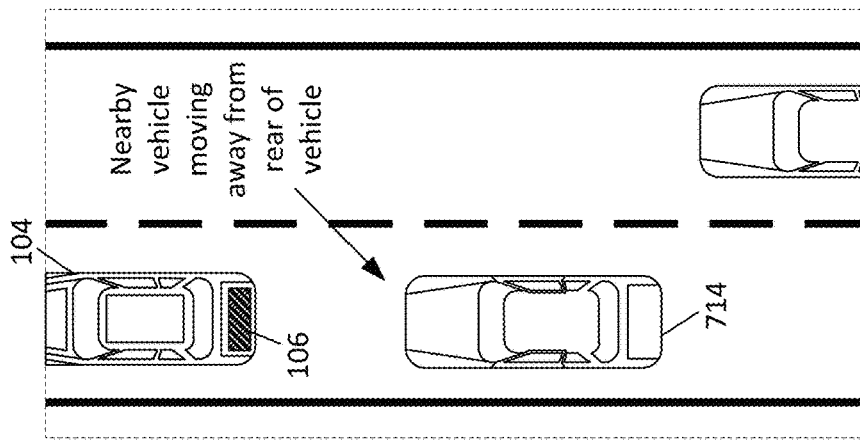
FIGS. 7A-7C are schematic illustrations of modifying a color-changing exterior surface of a vehicle in response to the proximity to a nearby vehicle, in accordance with embodiments of the disclosure.
Figure 7B:
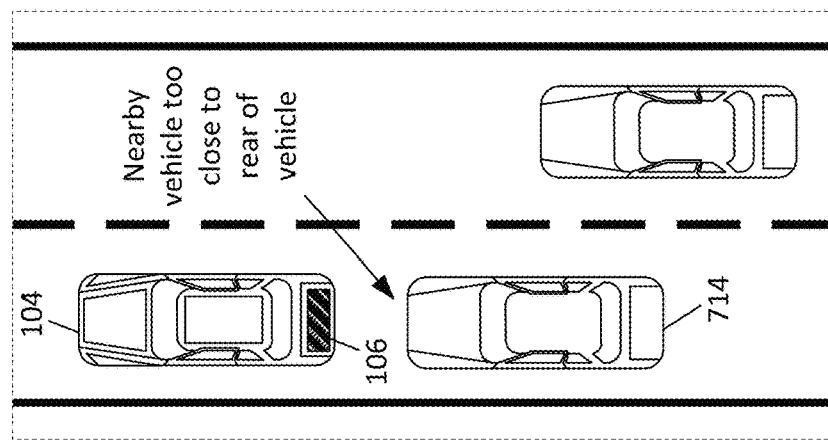
Figure 7A:
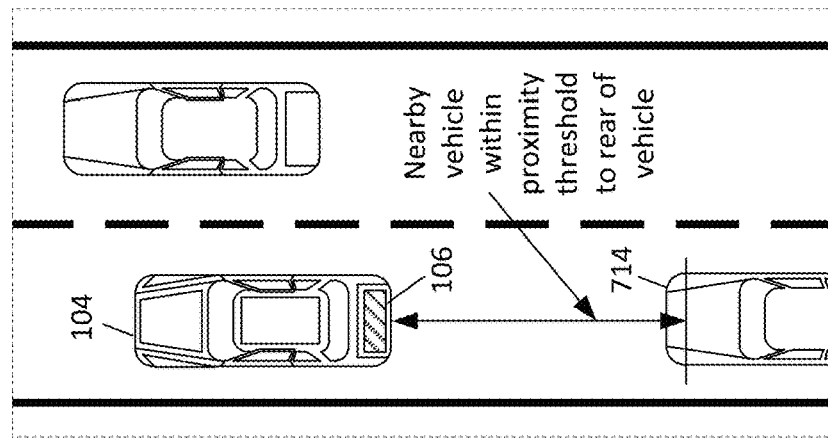

FIGS. 7A-7C are schematic illustrations of modifying a color-changing exterior surface of the vehicle 104 in response to the proximity to a nearby vehicle 714, in accordance with embodiments of the disclosure. A dynamic color scheme is applied to the color-changing exterior surface 106 that changes as the distance between the vehicle 104 and the nearby vehicle 714 changes.

Referring to FIG. 7A, a nearby vehicle 714 approaches a rear of the vehicle 104 and encroaches a rear proximity threshold. A color-changing exterior surface 106 located on the rear of the vehicle 104, such as on the trunk, changes color to alert the nearby vehicle 714 they are tailgating.

Referring to FIG. 7B, the nearby vehicle 714 is positioned too close to the rear of the vehicle 104. The color of the color-changing exterior surface 106 changes to alert the nearby vehicle 714. The color may be changed in different ways. In some a tint of the color-changing exterior surface 106 is increased. In some embodiments, a shade of the color-changing vehicle 714 is decreased. In some embodiments, the saturation may be increased. In some embodiments, a different color may be used.

Referring to FIG. 7C, the nearby vehicle 714 is positioned further away from the vehicle 714, and within the proximity threshold. The color of the color-changing exterior surface 106 changes, such as by reducing the tint, to let the nearby vehicle 714 know they are moving away from the rear of the vehicle 104.

FIGS. 8A-8C are schematic illustrations of modifying a color-changing exterior surface of a vehicle 804 to communicate the driver's intent, in accordance with embodiments of the disclosure. A dynamic color scheme is applied to a color-changing exterior surface 806 that changes based on the driver's intent. FIGS. 8A-8C are shown at consecutive points in time and are herein described together for clarity.

The vehicle 104 stops at an intersection and indicates it will turn right. For example, the vehicle 104 may turn on its right turn signal. The dynamic color scheme includes alternating colors and is applied to color-changing exterior surfaces 806 on the right side of the vehicle 804 to indicate the vehicle 104 intends to turn. Once it is safe to go, the vehicle 804 turns right at the intersection and the dynamic color scheme stops.

In some cases, a driver's mood may change based on driving conditions or other factors, which in turn affects their driving. As such, in some embodiments, one or more color-changing exterior surfaces of a vehicle are changed to communicate the driver's mood to surrounding vehicles. As an example, a driver might be getting angered by other vehicles, which increases the risk that they will drive recklessly. As such, control circuitry, in some embodiments, detects that the driver is angry and selects a pattern or color scheme for the color-changing exterior surfaces of the vehicle which indicates the driver's angry mood, thus allowing surrounding vehicles to maintain a safe distance between themselves and the potentially dangerous vehicle. In some implementations, control circuitry does this by detecting the driver's mood using cabin cameras or other suitable sensors, while in other implementations, the driver makes a selection on a user input interface indicating their mood, which prompts control circuitry to select a pattern or color scheme to be displayed on the color-changing exterior surfaces that best reflects the driver's mood. In some approaches, control circuitry receives data from external sensors (e.g., a smart watch that tracks data related to heart rate and sleep cycles) to help detect a driver's mood.

FIGS. 9A and 9B are schematic illustrations of modifying a color-changing exterior surface of a vehicle in response to an ambient temperature, in accordance with embodiments of the disclosure.

FIG. 9A depicts the color changing exterior surface 106 of vehicle 104 being adjusted to a darker color in order to absorb solar energy. In some embodiments, the control circuitry (e.g., control circuitry 1213, as shown in FIG. 12) of vehicle 104 receives data from temperature sensors indicating that the ambient temperature of the surrounding environment of vehicle 104 is below a certain threshold (e.g., below 40 degrees Fahrenheit). In response, the control circuitry selects a dark color scheme (e.g., a deep brown) that absorbs solar energy and instructs the active car paint controller (e.g., active car paint controller 1204, shown in FIG. 12) to modify the color changing exterior surface 106 to match the dark color scheme.

FIG. 9B depicts the color changing exterior surface 106 of vehicle 104 is adjusted to a light color in order to reflect solar energy. In some embodiments, the control circuitry (e.g., control circuitry 1213, as shown in FIG. 12) of vehicle 104 receives data from temperature sensors which indicates that the ambient temperature of the surrounding environment of vehicle 104 is above a certain threshold (e.g., above 90 degrees Fahrenheit). In response, the control circuitry selects a light color scheme (e.g., a white, or light gray color scheme) that reflects solar energy and instructs the active car paint controller (e.g., active car paint controller 1204, shown in FIG. 12) to modify the color changing exterior surface 106 to match the light color scheme. In some embodiments, the control circuitry accesses a table which specifies, for a variety of ambient temperature thresholds, which color scheme the color changing exterior surface 106 should be changed to. As an example, the control circuitry, in response to receiving data from temperature sensors indicating that the ambient temperature is 85 degrees Fahrenheit, may access a table which specifies that, when the ambient temperature is between 80 and 90 degrees Fahrenheit, the color changing exterior surface of the vehicle should be a pale blue color.

In some approaches, the control circuitry selects a color scheme that either absorbs or reflects solar energy in response to receiving data related to anticipated, predicted, or forecasted temperature. In some implementations, control circuitry may select a color scheme that either absorbs or reflects solar energy in response to receiving data from interior temperature sensors indicating that the temperatures of internal parts of the vehicle are either above or below a certain threshold. Control circuitry, in some embodiments, adjusts the color scheme based on the available energy reserve of the vehicle, as determined by monitoring the vehicle's accessory usage (e.g., air conditioning, heating, and entertainment system usage) and the state of charge of the vehicle's battery.

Figure 10B:
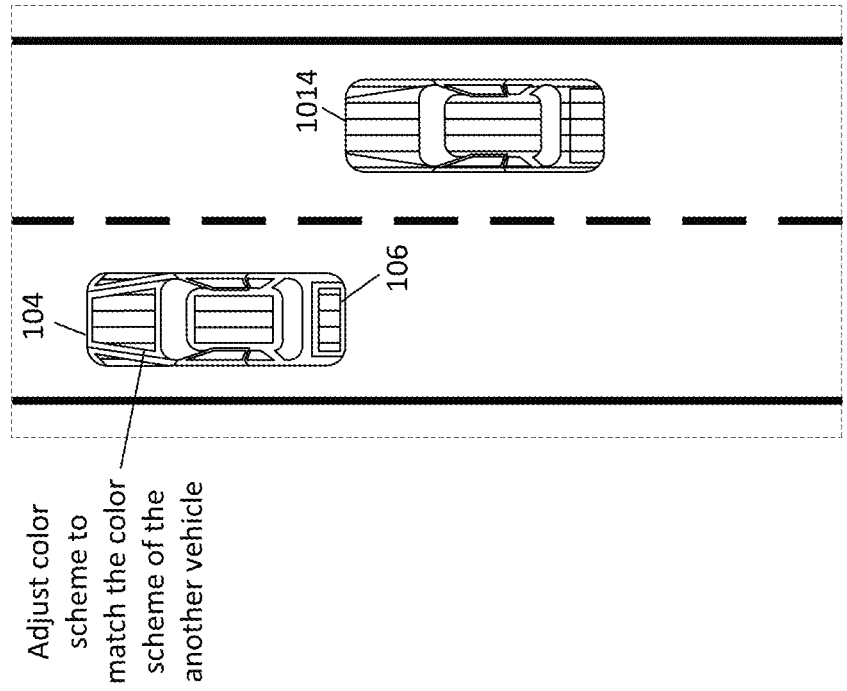
FIGS. 10A and 10B are schematic illustrations of modifying a color-changing exterior surface of a vehicle to match another vehicle, in accordance with embodiments of the disclosure.
Figure 10A:
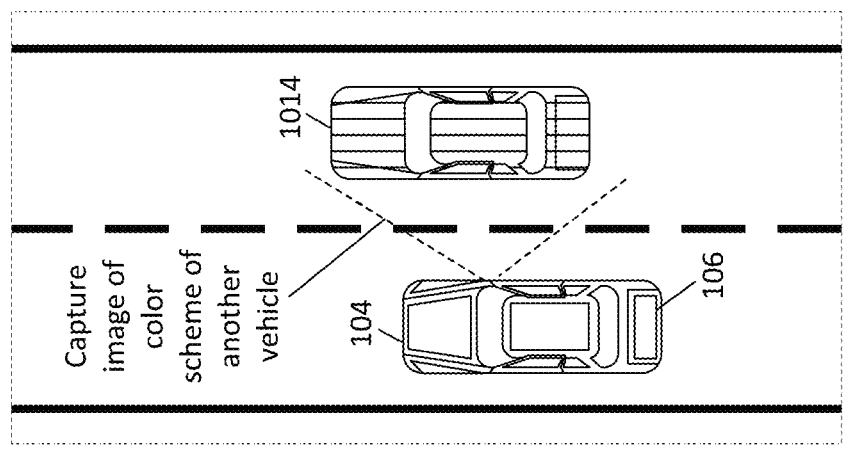

FIGS. 10A and 10B are schematic illustrations of modifying a color-changing exterior surface of a vehicle to match another vehicle, in accordance with embodiments of the disclosure. FIGS. 10A and 10B are shown at consecutive points in time and are herein described together for clarity.

The vehicle 104 is driving past another vehicle 1014, which is driving in a lane adjacent to vehicle 104. In some embodiments, one or more of the vehicular sensors (e.g., one of the sensors 1206, shown in FIG. 12, which may include Lidar sensors, proximity sensors, etc.) or cameras (e.g., cameras 1205, shown in FIG. 12) of vehicle 104 detect that vehicle 1014 is in the proximity of vehicle 104. In some embodiments, the control circuitry of vehicle 104, upon receiving data from the sensors or cameras which indicates that vehicle 1014 is in the proximity of vehicle 104, processes images received from the cameras and detects that vehicle 1014 also has its active car paint switched on. In other approaches, control circuitry of vehicle 104 detects that the active car paint of vehicle 1014 is switched on by communicating with the control circuitry of vehicle 1014 over a communications network, such as a V2V network (e.g., communications network 1301). In some implementations, the control circuitry of vehicle 104 displays, on a user input interface (e.g., user input interface 1201) or on a user device, the option to select the active paint configuration of vehicle 1014 or save the active paint configuration of vehicle 1014 in a library of active paint configurations for future use. In other embodiments, a user or occupant of vehicle 104 may also indicate via voice command that they are interested in the active paint configuration of vehicle 1014.

As vehicle 104 passes the other vehicle 1014, one or more of vehicular cameras (e.g., camera 1205, shown in FIG. 12) captures an image of the color scheme of the other vehicle 1014, as shown in FIG. 10A. Control circuitry of vehicle 104 processes the image and instructs the active car paint controller (e.g., active car paint controller 1203, shown in FIG. 12) to adjust the color scheme of the color changing exterior surface 106 to match the color scheme of the other vehicle.

In other embodiments, vehicle 104 may receive the active car paint configuration of vehicle 1014 by communicating with control circuitry of vehicle 1014 over a network.

Figure 11:
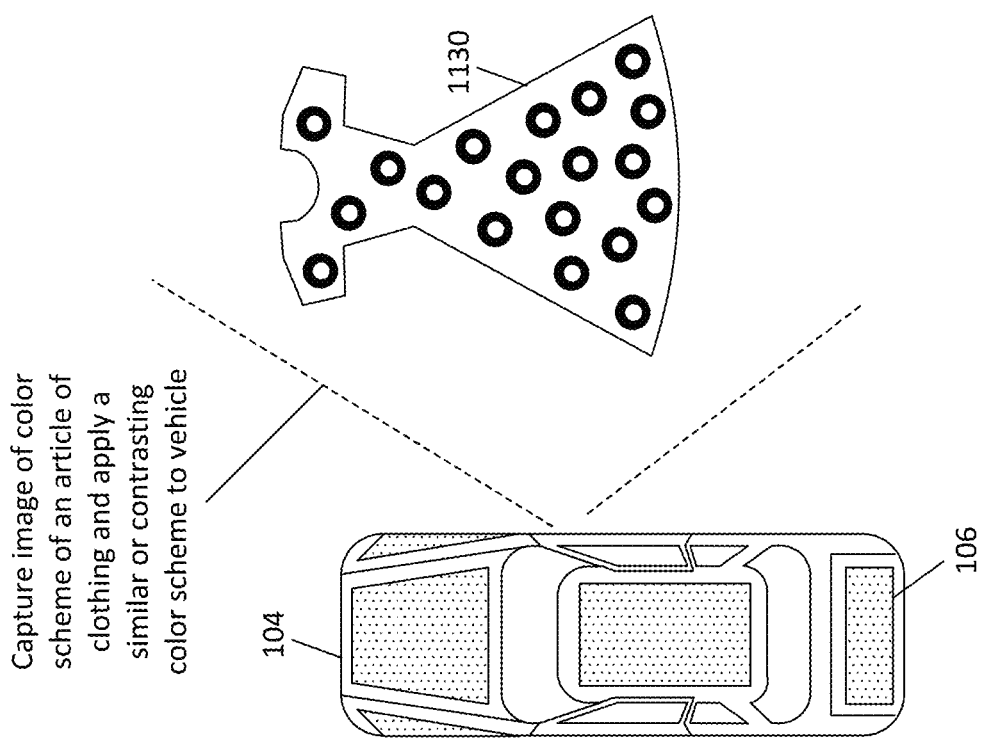
FIG. 11 is a schematic illustration of modifying a color-changing exterior surface of a vehicle to match an article of clothing, in accordance with embodiments of the disclosure.

FIG. 11 is a schematic illustration of modifying a color-changing exterior surface of a vehicle to match an article of clothing, in accordance with embodiments of the disclosure.

FIG. 11 depicts a dress 1130 with a pattern of spots on it. One or more cameras (e.g., camera 1205, shown in FIG. 12), which are either integrated with vehicle 104 or connected to vehicle 104 over a communication network (e.g., communication network 1301, shown in FIG. 13) capture an image of a color scheme of the dress 1130. Control circuitry of vehicle 104 uses image processing techniques to extract the color scheme of the dress and select a color scheme which is harmonious with the color scheme of the dress 1130. The selected color scheme is applied on the color changing exterior surface 106 by the active car paint controller (e.g., active car paint controller 1203, shown in FIG. 12). In some embodiments, control circuitry extracts the pattern of the dress using the image processing techniques and generates a pattern to be displayed on the color-changing exterior surface of the vehicle. Control circuitry may, in such embodiments, apply different color schemes or patterns to different independently controlled active surfaces of the vehicle. In similar embodiments, a user may be prompted to, on a user input interface (e.g., user input interface 1201, shown in FIG. 12), select their preferences with regards to which color schemes and patterns they would like displayed on the various independently controlled active surfaces that comprise color changing exterior surface 106. In some implementations, control circuitry selects a color scheme which contrasts the color scheme of the dress 1203. In some approaches, control circuitry applies a machine learning model to generate variations of the same pattern or color scheme, and prompt the user, via a user input interface to select one of the generated patterns or color schemes to be displayed on the color changing exterior surface 106.

Figure 12:
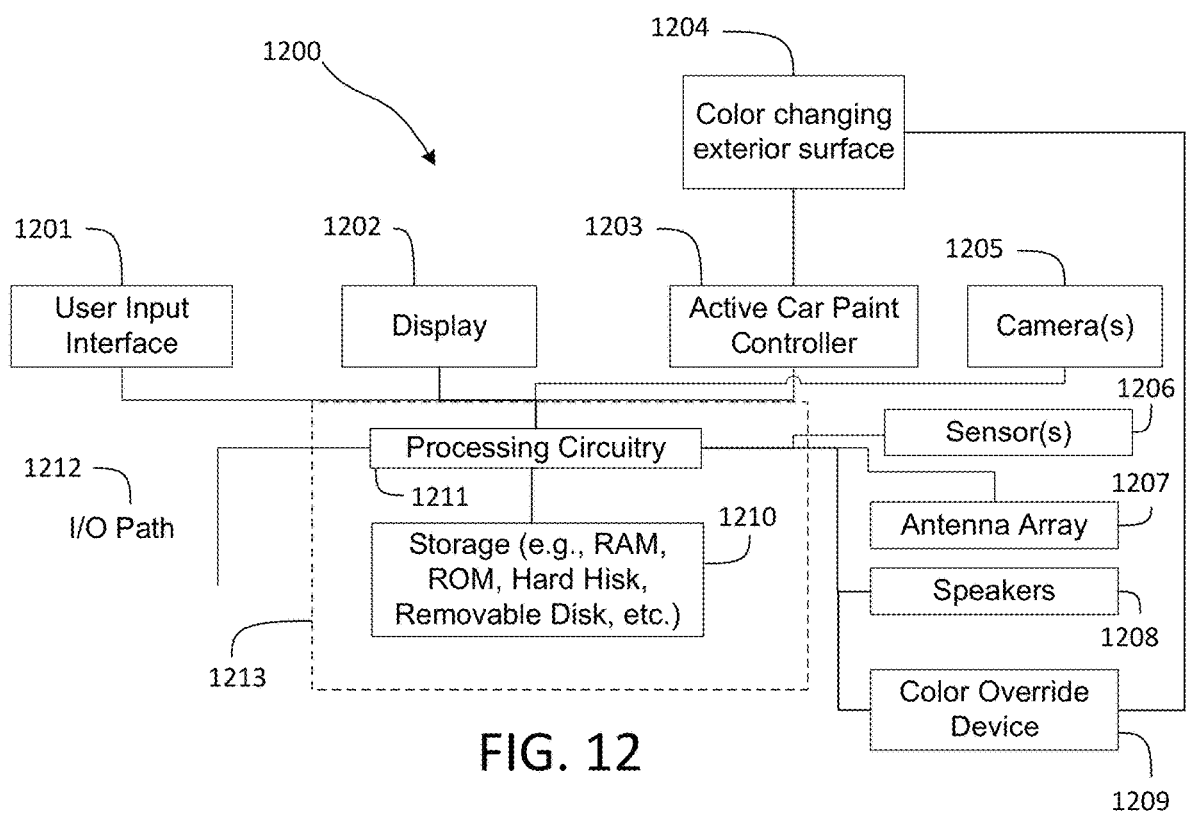
FIG. 12 depicts a block diagram of an illustrative example of a user equipment device, in accordance with embodiments of the disclosure.

FIG. 12 depicts a block diagram of an illustrative example of a user equipment device 1200, in accordance with embodiments of the disclosure. More specific implementations of user equipment devices are discussed above and below in connection with FIG. 12. User equipment devices 1200 may send and receive data via input/output (hereinafter "I/O") path 1212. I/O path 1212 may provide data to control circuitry 1213, which includes processing circuitry 1211 and storage 1210. Control circuitry 1213 may be used to send and receive commands, requests, and other suitable data using I/O path 1212.

Control circuitry 1213 may be based on any suitable processing circuitry such as processing circuitry 1211. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units. In some embodiments, control circuitry 1213 executes instructions for a vehicle content interface application stored in memory (i.e., storage 1210). Specifically, control circuitry 1213 may be instructed by the vehicle content interface application to perform the functions discussed above and below. For example, the vehicle content interface application may provide instructions to control circuitry 1213 to generate the audio content display. In some implementations, any action performed by control circuitry 1213 may be based on instructions received from the vehicle content interface application.

In client-server-based embodiments, control circuitry 1213 may include communications circuitry suitable for communicating with networks or servers. The instructions for carrying out the above-mentioned functionality may be stored on a server. Communications circuitry may include a cable modem, an Ethernet card, or a wireless modem for communications with other equipment, or any other suitable communications circuitry. Such communications may involve the internet or any other suitable communications network or paths (which are described in more detail in connection with FIG. 13). In addition, communications circuitry may include circuitry that enables peer-to-peer communication of user equipment devices, or communication of user equipment devices in locations remote from each other (described in more detail below).

In some embodiments, an antenna 1207 is provided in the user equipment device 1200. The antenna 1207 may comprise one or more of AM/FM radio antennas, satellite radio antennas, GPS antennas, Wi-Fi or cellular antennas, radar/sensor antennas, keyless entry antennas, or Bluetooth antennas.

Memory may be an electronic storage device provided as storage 1210 that is part of control circuitry 1213 (often referred to as an Electronic Control Unit, or ECU). As referred to herein, the phrase "electronic storage device" or "storage device" should be understood to mean any device for storing electronic data, computer software, or firmware, such as random-access memory, read-only memory, hard drives, optical drives, solid state devices, quantum storage devices, or any other suitable fixed or removable storage devices, and/or any combination of the same. Storage 1210 may be used to store various types of content described herein. Nonvolatile memory may also be used (e.g., to launch a boot-up routine and other instructions). Cloud-based storage may be used to supplement storage 1210 or instead of storage 1210.

The color-changing exterior surface 1204 consists of panels which can be independently controlled by active car paint controller 1203. In some embodiments, the panels may comprise miniscule pixels or microcapsules. In some approaches, the microcapsules are filled with colored particles that carry electrical charges, thus allowing the color of color changing exterior surface 1204 to be changed by modifying the electric charge of each point. The active car paint controller 1203 may control the color of the color changing exterior surface 1204 by changing the electrical charges of each point. While in some implementations, the color changing exterior surface 1204 only comprises one or two independently controlled active surfaces, in other implementations, the color changing exterior surface 1204 comprises many independently controlled active surfaces, each of which is color-programmable by the active car paint controller 1203. In some embodiments, each independently controlled active surface has constraints on the number of colors it can depict.

Figure 13:
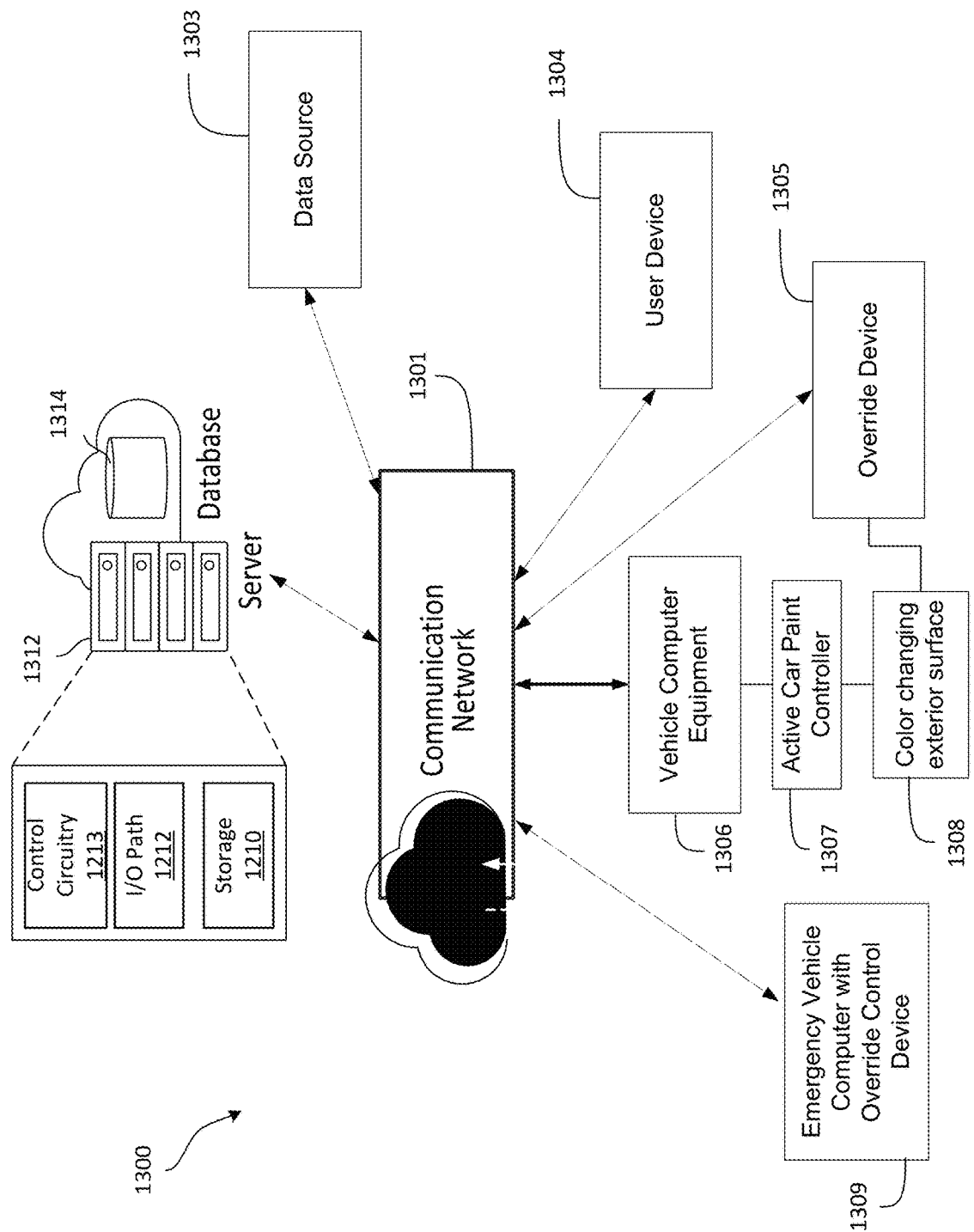
FIG. 13 depicts an example of an illustrative system implementing the user equipment device, in accordance with embodiments of the disclosure.

The color override device communicates with emergency response providers using a network (e.g., communication network 1301, shown in FIG. 13). In some embodiments, color override device 1209 receives, from an emergency response provider (e.g., law enforcement or first responders) over the network, a command to change the color scheme of the color-changing exterior surface 306 to a specified color scheme. The color override device, in response to the command, forces a color change of the color-changing exterior surface 306 to the specified color scheme. An example embodiment is described in reference to FIGS. 3A and 3B.

In one embodiment, speakers 1208 may be provided as integrated with other elements of user equipment device 1200 or may be stand-alone units. The audio, or any other content displayed on display 1202, may be played through speakers 1208. In some implementations, if music is being played via speakers 1208, control circuitry may select a dynamic pattern to be displayed on the color changing exterior surfaces which changes to the beat of the music.

Sensors 1206 are used to monitor, identify, and determine vehicular data. For example, the vehicle content interface application may receive vehicular speed data from the sensor 1206 or any other vehicular status data (e.g., global positioning data of the vehicle, driving condition of the vehicle, etc.) received from any other vehicular circuitry and/or component that describes the vehicular status of the vehicle. Cameras 1205 are used to capture images of the surrounding environment of the vehicle. In some embodiments, the cameras are provided as integrated with other elements of user equipment device 1200. In other approaches, the cameras may be part of an external device (e.g., a smartphone) which is connected to the user equipment device 1200 via a communication network (e.g., communication network 1301, shown in FIG. 13).

A vehicle content interface application may be implemented using any suitable architecture. For example, it may be a stand-alone application wholly implemented on user equipment device 1200. In such an approach, instructions of the application are stored locally (e.g., in storage 1210), and data for use by the application is downloaded on a periodic basis (e.g., from an out-of-band feed, from an internet resource, or using another suitable approach). Control circuitry 1213 may retrieve instructions of the application from storage 1210 and process the instructions to generate any of the displays discussed herein. Based on the processed instructions, control circuitry 1213 may determine what action to perform when input is received from input interface 1201. For example, movement of a cursor on an audio user interface element may be indicated by the processed instructions received from user input interface 1201.

In some embodiments, the vehicle content interface application is a client-server based application. Data for use by a thick or thin client implemented on user equipment device 1200 is retrieved on-demand by issuing requests to a server remote to the user equipment device 1200. In one example of a client-server based content application, control circuitry 1213 runs a web browser that interprets web pages provided by a remote server. For example, the remote server may store the instructions for the application in a storage device. The remote server may process the stored instructions using circuitry (e.g., control circuitry 1213) and generate the displays discussed above and below. The client device may receive the displays generated by the remote server and may display the content of the displays locally on user equipment device 1200. This way, the processing of the instructions is performed remotely by the server while the resulting displays are provided locally on user equipment device 1200. User equipment device 1200 may receive inputs from the user or occupant of the vehicle via user input interface 1201 and transmit those inputs to the remote server for processing and generating the corresponding displays. For example, user equipment device 1200 may transmit, via antenna 1207, a communication to the remote server indicating that a user interface element was selected via input interface 1201. The remote server may process instructions in accordance with that input and generate a display of content identifiers associated with the selected user interface element. The generated display is then transmitted to user equipment device 1200 for presentation to the user or occupant of the vehicle.

In some embodiments, the vehicle content interface application is downloaded and interpreted or otherwise run by an interpreter or virtual machine (executed by control circuitry 1213). In some embodiments, the vehicle content interface application may be encoded in the ETV Binary Interchange Format (EBIF), received by control circuitry 1213 as part of a suitable feed, and interpreted by a user agent running on control circuitry 1213. For example, the vehicle content interface application may be an EBIF application. In some embodiments, the vehicle content interface application may be defined by a series of JAVA-based files that are received and run by a local virtual machine or other suitable middleware executed by control circuitry 1213.

User equipment device 1200 of FIG. 12 can be implemented in system 1300 of FIG. 13 as vehicle media equipment 1314, vehicle computer equipment 1318, wireless user communications device 622 or any other type of user equipment suitable for accessing content, such as a user's smartphone. For simplicity, these devices may be referred to herein collectively as user equipment or user equipment devices and may be substantially similar to user equipment devices described above. User equipment devices, may function as stand-alone devices or may be part of a network of devices. Various network configurations of devices may be implemented and are discussed in more detail below.

FIG. 13 depicts an example of an illustrative system implementing the user equipment device, in accordance with embodiments of the disclosure. A user equipment device utilizing at least some of the system features described above in connection with FIG. 13 may not be classified solely as vehicle computer equipment 1306 or a user device 1304. For example, vehicle computer equipment 1306 may be remotely controlled via user device 1304.

The user equipment devices may be coupled to communication network 1301. Communication network 1301 may be one or more networks including the internet, a mobile phone network, mobile voice or data network (e.g., a 4G, 5G or LTE network), a vehicle-to-vehicle (V2V) network, or other types of communications network or combinations of communications networks.

System 1300 includes data source 1303 and vehicle computer equipment 1306 coupled to communication network 1301. Communications with the data source 1303 and the vehicle computer equipment 1306 may be exchanged over one or more communications paths. In some embodiments, vehicle computer equipment 1306 exchanges communications with the computer equipment of other nearby vehicles over one or more communications paths.

Data source 1303 may include one or more types of content distribution equipment including a media distribution facility, satellite distribution facility, programming sources, intermediate distribution facilities and/or servers, Internet providers, on-demand media servers, and other content providers. In some embodiments, the vehicle computer equipment 1306 accesses the data source 1303 to receive vehicle content interface data. In some approached, data source 1303 may be any suitable server configured to provide any information needed for operation of the vehicle computer equipment 1306 as describe above and below (e.g., in FIGS. 1-10). For example, data source 1303 may provide weather information, environment information, data about group of cars, and/or any other suitable data needed for operations of vehicle computer equipment 1306 (e.g., as described in FIGS. 1-10). In some implementations, vehicle content interface data may be provided to the user device 1304 from the data source 1303, which can be done using any suitable approach (e.g., a client-server approach). For example, a user device 1304 may pull content data from a server, or a server may present the content data to the user device 1304. Data source 1303 may provide user device 1304 the vehicle content interface application itself or software updates for the vehicle content interface application.

In some embodiments, the vehicle computer equipment 1306, which includes the control circuitry 1213, the I/O path 1212, and storage 1210, communicates over the communication network 1301 with a server 1312 to send and receive vehicle diagnostic data (e.g., data related to the vehicle's performance and internal systems, safety related data (e.g., data related to vehicle speed or braking, especially in the event of a collision), GPS and map data, trained machine learning models the vehicle computer equipment 1306 implements (e.g., analyzing driving conditions, or processing images), and any other necessary data. In some approaches, the vehicle computer equipment 1306 sends data (e.g., data collected from vehicular sensors) back to the server 1312, which the server 1312 stores in database 1314.

The active car paint controller 1307 controls the color of the color changing exterior surfaces 1308. To change the color of the color changing exterior surfaces, the active car paint controller 1307 receives instructions from the vehicle computer equipment 1306. In some embodiments, the vehicle computer equipment 1306 selects a color to modify the color changing exterior surfaces 1308 to and instructs the active car paint controller 1307 to modify the color of the color changing exterior surfaces to the selected color. For example, color changing exterior surface may be e-ink layer applied to surface of a vehicle, and the active car paint controller 1307 may be controller for states of the e-ink layer. In some embodiments, the active paint controller 1307 is a circuitry connecting the control circuitry to the color changing exterior surfaces to enable the color changing functionality of the one or more color changing exterior surfaces. For example, if the color-changing exterior surfaces comprise an e-ink layer applied to the surface of the vehicle, the active paint controller 1307 may include a set of wires for controlling each pixel of the e-ink displays. As such, the active paint controller, in some embodiments, applies electric fields or currents to the color changing exterior surface to change the color of the vehicle's exterior. In some implementations, the active car paint controller 1307 requires a large amount of energy to change or maintain patterns on the color changing exterior surface. The active car paint controller 1307 tracks the amount of energy required to change or maintain the pattern, and communicates with vehicle computer equipment 1306 to optimize the energy cost associated with changing or maintaining patterns on the color changing exterior surface 1308. As an example, if, while a vehicle is parked, a large amount of energy is required to maintain a specific pattern (e.g., a dynamic pattern) on the color changing exterior surface 1308, the active car paint controller 1307 may activate a separate, parked pattern that reduces the energy cost. In some embodiments, the vehicle computer equipment receives a GPS location of the driver's user device 1304 (e.g., a smartphone), and instructs the active car paint controller 1307 to de-activate the parked pattern and re-activate the user or occupant's selected pattern when the driver's GPS location is nearby the location of the parked vehicle. In some approaches, the vehicle computer equipment 1306 selects a pattern that makes the vehicle more visible to its user. In other embodiments, the vehicle computer equipment 1306 selects a pattern which allows the user to quickly verify a state of the vehicle (e.g., whether or not the vehicle is in a locked state).

Law enforcement may, in some cases, force color changes of the vehicles surrounding a specific vehicle (e.g., as shown in FIGS. 3A and 3B) to help track stolen vehicles or vehicles involved in a crime. In some approaches, law enforcement forces a stolen vehicle to display an image indicating that it is stolen, or changes the pattern displayed on the vehicles surrounding a stolen vehicle such that the stolen vehicle stands out from the surrounding vehicles. In such cases, the override device 1305 overrides instructions from the active car paint controller 1307 and forces a color change of the color changing exterior surface 1308 to display a specific pattern. The override device 1305 can be controlled only by law enforcement officials using an emergency vehicle computer 1309, which in some approaches, is part of a law enforcement vehicle. In other approaches, the emergency vehicle computer 1309 is remotely controlled by a portable device (e.g., a smartphone, or laptop). The emergency vehicle computer 1309 has an override control device, which exchanges communications over network 1301 with the override device 1305 to force specific patterns onto color changing exterior surface 1307. In some embodiments, the emergency vehicle computer 1309 requests from vehicle computer equipment 1306 any data collected from vehicular sensors that may help law enforcement track cars part of a crime. For example, the override device 1305 may be a system on a chip embedded into the vehicle computer equipment 1306, and may comprises a network component (e.g., a cellular network card) and cryptographic component (e.g., a pre-shared secret) that would authenticate messages received from a law enforcement device. For example, override device 1305 may only trigger active car paint controller 1307 when a message is received that is signed with the pre-shared key. In this way, only police equipment (e.g., emergency vehicle computer with override control device 1309) with the pre-shared key may override the color changing exterior surface 1308.

Figure 14:
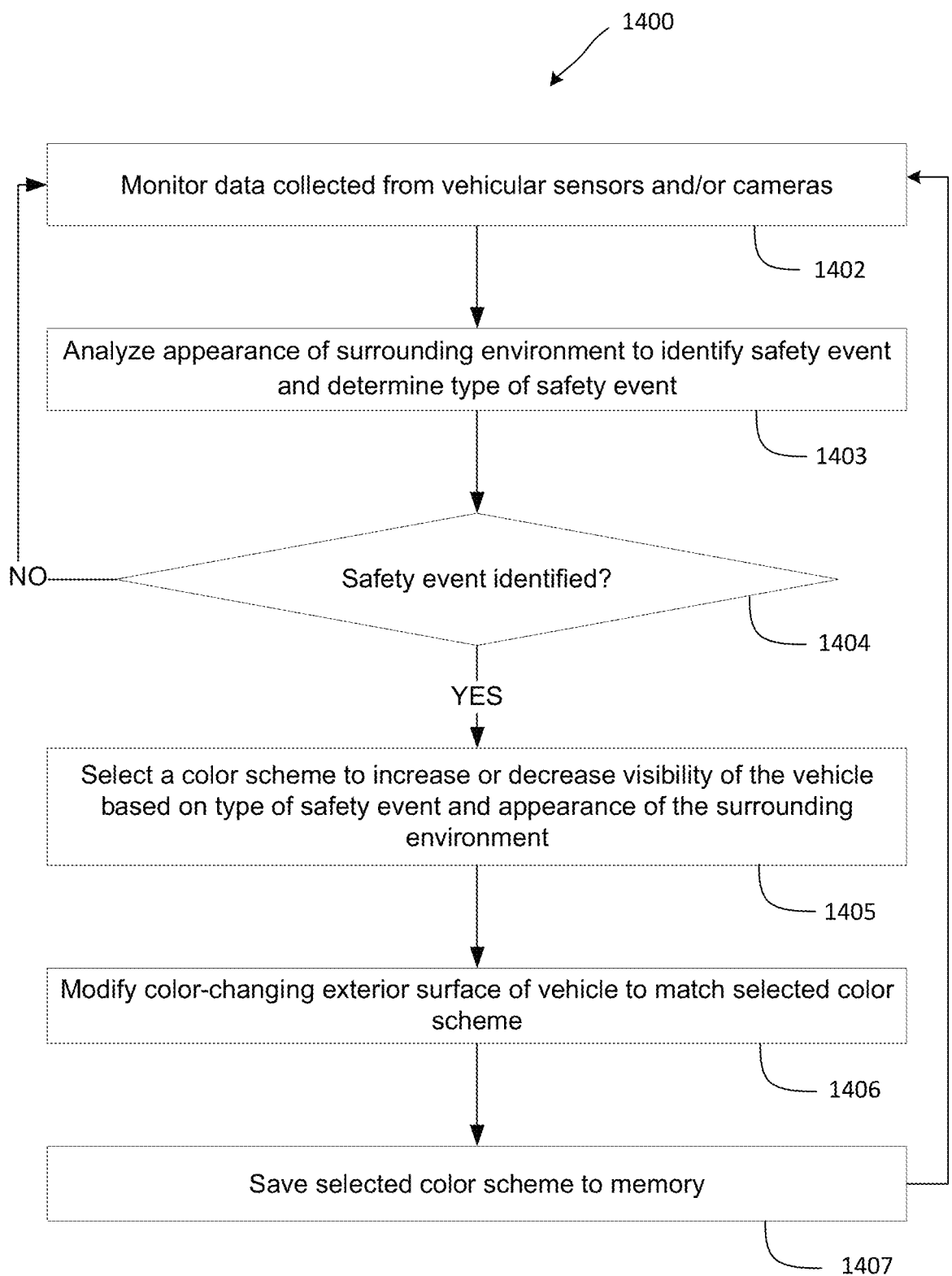
FIG. 14 depicts an illustrative flowchart of a process for modifying a color-changing exterior surface of a vehicle, in accordance with some embodiments of the disclosure.

FIG. 14 depicts an illustrative flowchart for a process 1400 for modifying the color-changing exterior surface of a vehicle after identifying a potential safety event in the surrounding area of the vehicle, in accordance with some embodiments of this disclosure. In various embodiments, the individual steps of process 1400 may be implemented by one or more components of the devices and systems of FIGS. 1-13. Although the present disclosure may describe certain steps of process 1400 (and of other processes described herein) as being implemented by certain components of the devices and systems of FIGS. 1-13, this is for purposes of illustration only, and it should be understood that other components of the devices and systems of FIGS. 1-13 may implement those steps instead.

Process 1400 begins at step 1402, where a control circuitry (for example, control circuitry 1213 of FIG. 12), monitors data collected from a camera (e.g., camera 1205 of FIG. 12) or one or more of vehicular sensors (e.g., sensors 1206 of FIG. 12). Control circuitry monitors data in a variety of ways, as described above and below.

In some embodiments, when a vehicle is driving through an environment with low visibility, (e.g., as shown in FIG. 1), a visibility sensor computes a visibility average by calculating the amount of light which is scattered by particles in the air (e.g., fog, smoke, or haze). Similarly, the control circuitry monitors visibility by collecting data from light sensors which monitor the amount of ambient light in the vehicle's surrounding environment. The light sensors quantify the amount of ambient light present by converting photons of light energy detected to electrons (e.g., electrical energy).

In some approaches, the control circuitry detects a user input via a user input interface (e.g., via U.I. interface 1201) indicating a potential safety event. For example, control circuitry may detect a UI input (e.g., via UI interface 1201) that indicates adverse weather conditions or low visibility by pressing a button or touching a touch-enabled UI element labeled "bad weather" or "low visibility."

In some implementations, the control circuitry also monitors weather-related conditions (e.g., snow, as shown in FIG. 2) in the surrounding area of the vehicle. In some embodiments, control circuitry receives images or video from the vehicle's cameras. The images are processed by the control circuitry using any suitable method (e.g., machine learning models) to identify the presence of snow, rain, or other weather conditions. Control circuitry may also monitor data received from radar to detect precipitation or snow in the surrounding area of the vehicle.

In some approaches, control circuitry downloads, over a communication network (e.g., communication network 1301, shown in FIG. 13), map related data which can be used to monitor safety events in and around the vehicle's exact location. In some embodiments, weather conditions such as heavy snow can potentially block vehicular cameras and sensors. Instead, control circuitry receives regarding weather conditions in the surrounding area of the vehicle by accessing the exact location of the vehicle from the global positioning system (GPS) and downloading a digital weather map corresponding to that location via the communication network. In similar implementations, a user may input, via a user input interface (e.g., user input interface 1201, shown in FIG. 12), their planned destination, in which case the control circuitry accesses, over the communication network, a route which takes the user to their planned destination. The control circuitry then downloads a digital weather map corresponding to the route and receives data regarding weather events along the route. In another embodiment, control circuitry downloads geofencing data over the communication network to monitor the relative safety of the area that the vehicle is in and determine whether the vehicle has entered a geofence surrounding a high-crime area (e.g., the geofence surrounding a high-crime area 422A from FIG. 4A). In some cases, the user's planned route may span an entire day such that the route begins in daylight and ends after nightfall, or vice versa. As such, in some implementations, control circuitry uses information from the user's planned route that indicates such a change in visibility within certain segments of the route to select color schemes for each segment which maximize the vehicle's contrast with its surrounding environment. As an example, control circuitry selects a black color for the first segment of a route where the user begins driving during daylight. Control circuitry then identifies a second segment of the route where the visibility is decreased due to nightfall, and as a result, selects a white color scheme for the second segment of the route to maximize the vehicle's contrast with its surroundings.

The process 1400 then continues at step 1403, where, based on the data received from the vehicular sensors and cameras, the control circuitry analyzes the appearance of the surrounding environment to identify a safety event and determines the type of safety event. In some embodiments, the control circuitry, at this step, executes an environmental analysis application which is run by the control circuitry to determine the appearance of the surrounding environment. In some approaches, the environmental analysis application run by the control circuitry uses a trained machine learning model (e.g., a convolutional neural network) on the data received from the vehicular sensors and cameras to determine the appearance of the surrounding environment.

In some embodiments, once the control circuitry (e.g., by running the environmental analysis application) has completed its analysis of the appearance of the surrounding environment, the control circuitry executes a safety event classification system, which is run by the control circuitry to analyze the results of the environmental analysis application and determine the type of safety event identified. The control circuitry (e.g., by running the safety event classification system) decides, at step 1404, whether or not a safety event has been identified. If a safety event has been identified, the control circuitry, by running the safety event classification system, identifies what type of safety event has been identified. If a safety event has not been identified, the process 1400 restarts at step 1400, where control circuitry continues to monitor data collected from vehicular sensors and cameras. For example, as shown in FIG. 1, the control circuitry determines, by running the safety event classification system based on raw data from the light and visibility sensors as well as the results of the environmental analysis application, that the safety event identified is heavy fog.

The process 1400 then continues at step 1405, where the control circuitry selects a color scheme to increase or decrease the visibility of the vehicle based on the type of safety event and the appearance of the surrounding environment. In some approaches, the control circuitry runs a machine learning model which is trained to select the most optimal color scheme based on the type of safety event and the results of the environmental analysis application. The control circuitry analyzes the results received from running the environmental analysis application and the safety event classification system, and determines that, for example, as shown in FIG. 1, the color changing exterior surface (e.g., color changing exterior surface 1204 from FIG. 12) should be changed to a bright red to distinguish the vehicle from its surroundings. In some implementations, the control circuitry retrieves from storage (e.g., storage 1210, from FIG. 12) a previously selected color scheme which was used in a prior safety event very similar to the safety event currently identified. In other implementations, the active car paint controller (e.g., car paint controller 1203, from FIG. 12) selects the color scheme most appropriate for the type of safety event upon receiving the necessary data from the control circuitry.

At step 1406, the control circuitry, upon selecting an appropriate color scheme, instructs the active car paint controller to modify the color changing exterior surface to match the selected color scheme. As an example, the control circuitry may instruct the active car paint controller to modify the color changing exterior surface to match the selected bright red color scheme, in order to stand out from a foggy external environment (e.g., the foggy environment 102, shown in FIG. 1). In some embodiments, the active car paint controller adjusts the selected color scheme to match the geometry of certain surfaces on the vehicle's exterior. As an example, the control circuitry may instruct the active car paint controller to apply a dynamic color scheme, which may have a high energy cost required to generate and maintain a certain resolution and color variation density, to the color changing exterior surface of the vehicle (e.g., as shown in FIG. 6A-6B), in which case the active car paint controller may slightly adjust the color scheme in order to optimize the energy cost.

The process 1400 then continues at step 1406, where the selected color scheme is then saved to the storage. In some embodiments, the storage stores the selected color scheme in a library of color schemes which stores every unique color scheme that has been applied to the vehicle's color changing exterior surface, allowing the user to activate specific color schemes directly, without reprocessing. In some approaches, the storage saves every color scheme which has been applied to the vehicle's color changing exterior surface within a set time period (e.g., one month). In some implementations, memory stores a location associated with each color scheme. The location, in some approaches, may be one which is determined by the control circuitry while the color changing exterior surface is being modified to the selected color scheme.

Figure 15:
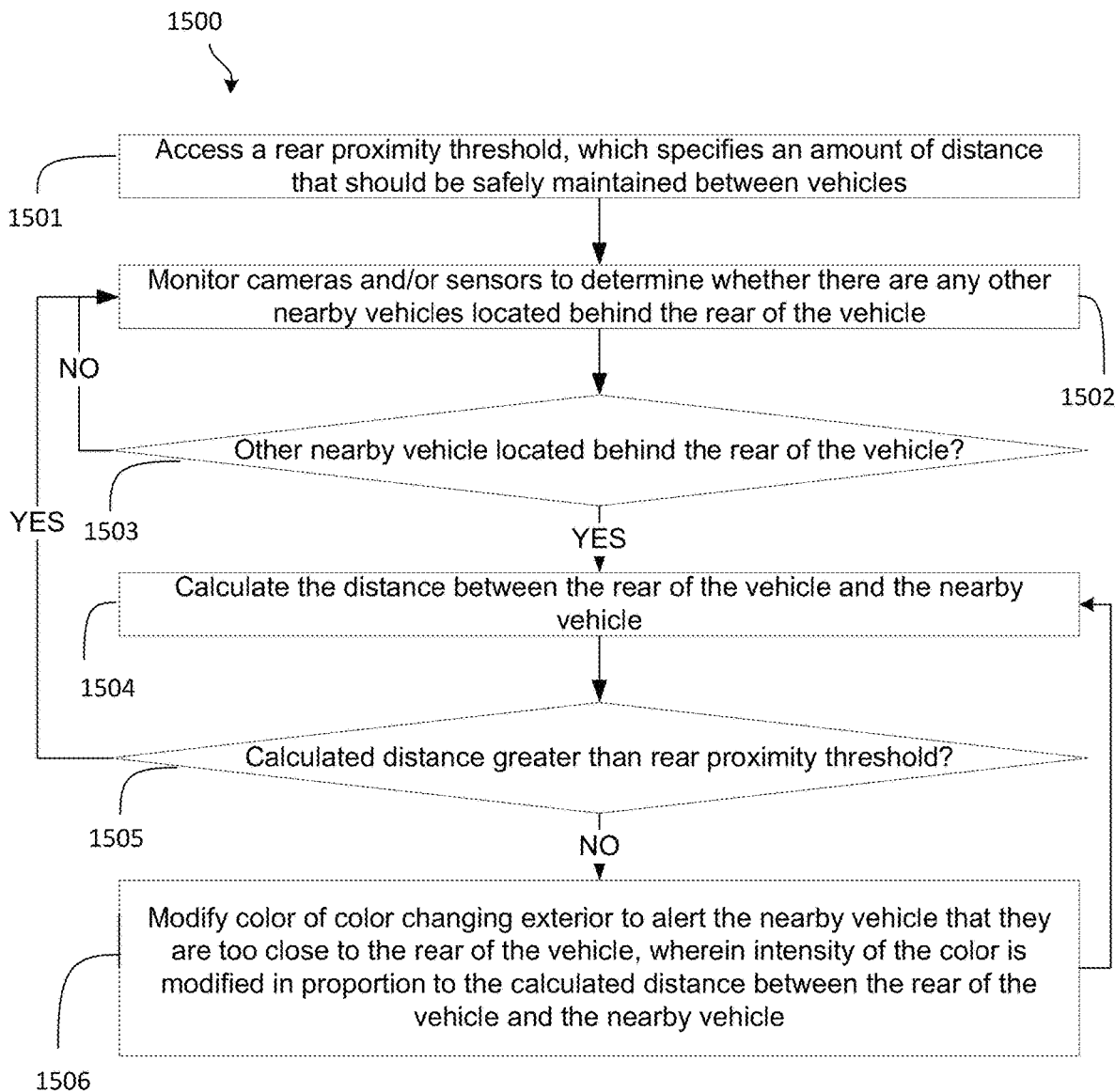
FIG. 15 depicts an illustrative flowchart for a process for modifying a color-changing exterior surface of a vehicle when another vehicle begins to tailgate the rear of the vehicle.

FIG. 15 depicts an illustrative flowchart of a process 1500 for modifying a color-changing exterior surface of a vehicle, in accordance with some embodiments of the disclosure.

The process 1500 begins at step 1501, where the control circuitry (e.g., control circuitry 1213, shown in FIG. 12) accesses from a storage (e.g., storage 1210, shown in FIG. 12) a rear proximity threshold, which specifies an amount of distance that should be safely maintained between two vehicles (e.g., vehicle 104 and vehicle 714 from FIGS. 7A-7C). In some embodiments, a user may specify a desired rear proximity threshold through a user input interface (e.g., user input interface 1201, as shown in FIG. 12), which is then saved in storage. In other approaches, the control circuitry may access a pre-set rear proximity threshold which has been specified by an entity such as the vehicle's manufacturer based on the safety standards of the vehicle.

The process 1500 continues at step 1502, where the control circuitry monitors one or more of vehicular cameras (e.g., cameras 1205, as shown in FIG. 12) and vehicular sensors (e.g., sensors 1206, as shown in FIG. 12) to determine whether there are any other nearby vehicles located behind the rear of the vehicle. In some approaches, the control circuitry monitors proximity sensors, which detect the presence of other nearby vehicles as they enter within a certain radius larger than the rear proximity threshold around the vehicle, to detect whether there are any other nearby vehicles located in any proximity of the vehicle. In other implementations, the control circuitry monitors cameras located at the rear of the vehicle to detect whether there are any other vehicles driving at any distance behind the rear of the vehicle.

At step 1503, the control circuitry, based on data received from the vehicular cameras and sensors, determines whether there is another nearby vehicle (e.g., vehicle 714 from FIGS. 7A-7C) located behind the rear of the vehicle at any distance. In some implementations, control circuitry makes this decision after using trained machine learning models to analyze data received from the vehicular cameras or from the sensors. If the control circuitry identifies that there is no vehicle located anywhere behind the rear of the vehicle, the process 1500 returns to step 1502, and the control circuitry continues monitoring the cameras and sensors to determine whether there are any other nearby vehicles located behind the rear of the vehicle. If the control circuitry determines that there is a vehicle located, at any distance, behind the rear of the vehicle, the process 1500 continues at step 1504, where the control circuitry calculates the distance between the rear of the vehicle and the other nearby vehicle. In some embodiments, the control circuitry calculates the distance between the rear of the vehicle and the other nearby vehicle by using distance sensors which output signals (e.g., laser or ultrasonic waves) and read how the signals change after bouncing off the other nearby vehicle. In other approaches, the control circuitry calculates the distance between the rear of the vehicle and the other nearby vehicle using LiDAR sensors, which use laser beams to measure distance.

The process 1500 continues at step 1505, where the control circuitry determines whether the calculated distance is greater than the rear proximity threshold accessed in step 1501. If the control circuitry determines that the calculated distance is greater than the rear proximity threshold, the process 1500 restarts from step 1502, and the control circuitry continues to monitor the vehicular cameras and sensors. If the control circuitry determines that the calculated distance is not greater than the rear proximity threshold (e.g., as shown in FIG. 7A), the process continues to step 1506, where the control circuitry instructs the active car paint controller (e.g., active car paint controller 1203, shown in FIG. 12) to modify the color of the color changing exterior surface such that the intensity of the color is modified in proportion to the calculated distance between the rear of the vehicle and the nearby vehicle, in order to alert the nearby vehicle that they are too close to the rear of the vehicle. For example, as shown in FIG. 7B, the control circuitry continually monitors the distance between the rear of the vehicle and the nearby vehicle and instructs the active car paint controller to increase the tint on the color changing exterior surface (e.g., the color changing exterior surface 1204, shown in FIG. 12) as the calculated distance between the rear of the vehicle and the nearby vehicle decreases. As the calculated distance between the nearby vehicle and the rear of the vehicle grows (e.g., as shown in FIG. 7C), the control circuitry instructs the active car paint controller to decrease the tint of the color changing exterior surface.

Figure 16:
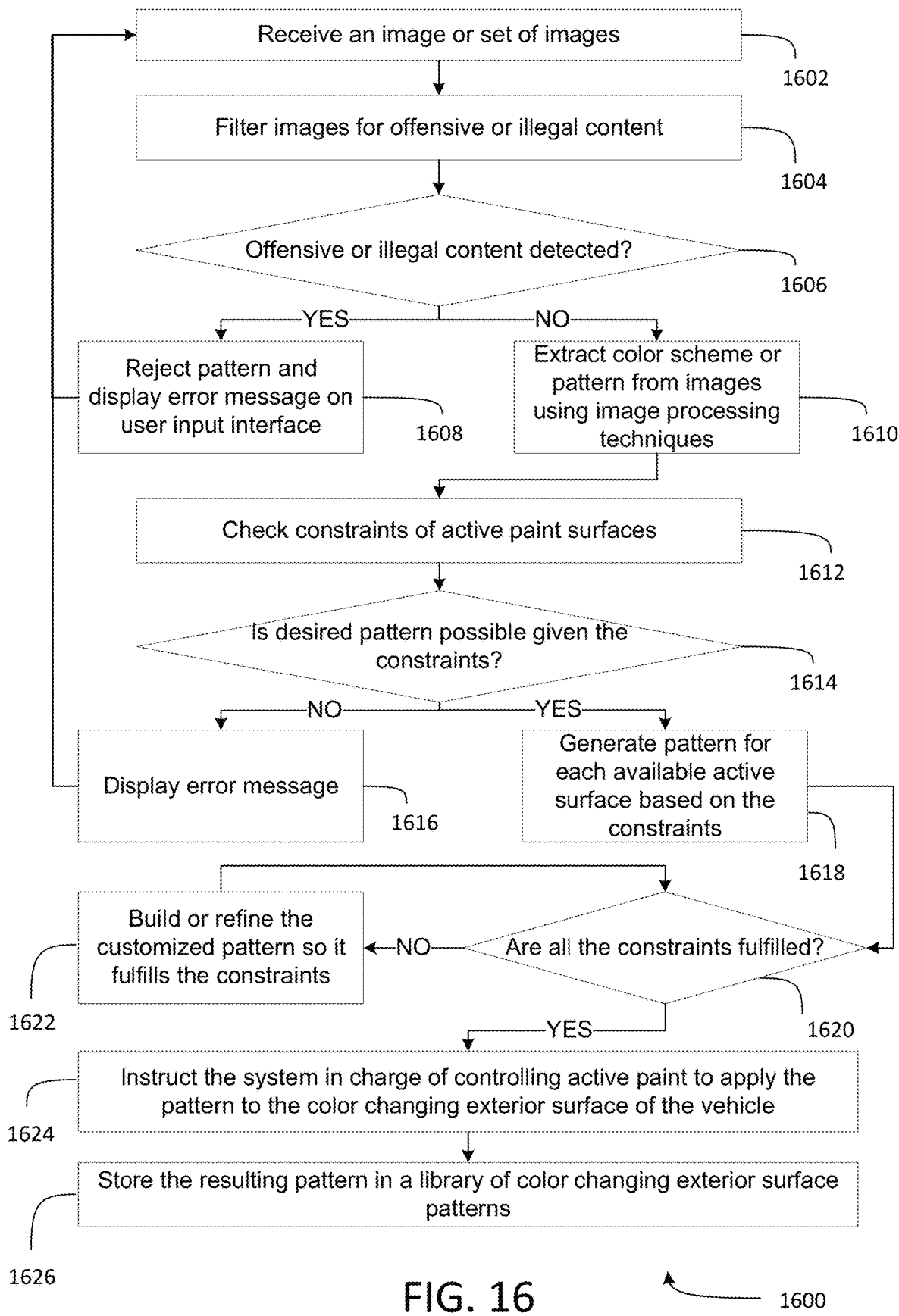
FIG. 16 depicts an illustrative flowchart for a process for modifying a color-changing exterior surface of a vehicle, in accordance with some embodiments of the disclosure.

FIG. 16 depicts an illustrative flowchart for a process 1600 for modifying the color-changing exterior surface of a vehicle to match in the surrounding area of the vehicle, in accordance with some embodiments of this disclosure.

The process 1600 begins at step 1602, where a control circuitry (e.g., control circuitry 1213, shown in FIG. 12) receives an image or a set of images related to a color scheme that the color changing surface of the vehicle should be adjusted to. The control circuitry receives these images in a variety of ways.

In some embodiments, the images are taken by one or more vehicular cameras (e.g., camera 1205, shown in FIG. 12) after a user makes a selection on a user input interface (e.g., user input interface 1201, shown in FIG. 12) indicating that they would like a photo to be taken of a particular object in the vehicle's surrounding area. In some implementations, control circuitry may receive images that are uploaded by a user via a user input interface. In other implementations, control circuitry receives photos from a portable device (e.g., a user's smartphone) over a communication network (e.g., communication network 1301, shown in FIG. 13). As an example, as shown in FIG. 11, control circuitry may receive photos of an article of clothing (e.g., the dress 1130, shown in FIG. 11) from a user who wishes to match the color scheme of the color changing exterior surface of their vehicle (e.g., color changing exterior surface 1204, shown in FIG. 12) with the color scheme of the article of clothing.

In some approaches, control circuitry receives photos which were automatically taken by vehicular cameras of the vehicle's surrounding environment. For example, as shown in FIG. 4A, when a vehicle enters a geo-fence surrounding an area with a high crime rate, control circuitry receives photos automatically taken by vehicular cameras, and uses the photos to adjust the vehicle's color scheme to be harmonious with surrounding vehicles (e.g., vehicles 414, shown in FIG. 4A). In some embodiments, control circuitry receives photos from nearby vehicles over a communication network (e.g., communication network 1301, shown in FIG. 13). As an example, the control circuitry of a vehicle travelling in a convoy or parade (e.g., the plurality of vehicles travelling in a convoy 504, shown in FIGS. 5A-5B) may receive photos of a desired color scheme from other vehicles travelling in the same convoy or parade.

The process 1600 continues at step 1604, where the control circuitry filters the received images for offensive or illegal content. In some approaches, the control circuitry runs a machine learning model trained to recognize content within images that is offensive or illegal. In some embodiments, the control circuitry recognizes content within images that is commercially protected. If, at step 1606, offensive or illegal content is detected by control circuitry, the process 1600 continues at step 1608, where the control circuitry rejects the pattern from the image and displays an error message on the user input interface. In some implementations, the user input interface displays, alongside the error message, an option to upload new images without the offensive content. In some embodiments, if control circuitry rejected an image due to the presence of commercially protected content, control circuitry may display, on the user input interface, the option to buy or obtain a license for the content. In some approaches, control circuitry presents the option to buy or obtain a license for the content via the car paint marketplace.

If, at step 1606, control circuitry does not detect offensive or illegal content, the process 1600 continues at step 1610, where the control circuitry extracts a color scheme or pattern from the images using image processing techniques. In some embodiments, the control circuitry begins the image processing by isolating one aspect of the image (e.g., isolating a portion of a larger image that depicts the user wearing dress 1130, shown in FIG. 11) from the rest of the image. In some implementations, control circuitry continues the image processing by further segmenting the isolated portion of the larger image. As an example, control circuitry may segment an isolated image of a user wearing a dress (e.g., dress 1130, shown in FIG. 11) to further isolate the dress from the rest of the user's body. In some approaches, control circuitry further processes the segments using computer vision machine learning models specifically trained to extract patterns from various types of segmented images. In some embodiments, the control circuitry further processes the extracted patterns to create a seamless compound texture which includes one or more of the extracted patterns. In some approaches, the control circuitry processes the extracted patterns and generates a contrasting pattern to be applied on the color changing exterior surface of the vehicle. In some implementations, the control circuitry applies machine learning models to generate multiple variations of the extracted patterns.

The process 1600 continues at step 1610, where the control circuitry checks the constraints of the color changing exterior surface (e.g., color changing exterior surface 1204, shown in FIG. 12). In some embodiments, the constraints include one or more of the number of supported colors, the geometry of the surfaces and their location in the car, the maximum resolution/pixel size, or an energy cost associated with generating and maintaining a certain resolution and color variation density. At step 1614, the control circuitry determines whether the color scheme extracted during step

1610 is possible given the constraints of the color changing exterior surface. If control circuitry determines that the color scheme is not possible given the constraints of the color changing exterior surface, the process 1600 continues at step 1616, where an error message is displayed on the user input interface. If control circuitry determines that the color scheme is possible given the constraints of the color changing exterior surface, the process 1600 continues at step 1618, where the control circuitry generates a pattern for each available active surface based on the constraints.

At step 1620, the control circuitry determines whether all constraints have been fulfilled within the patterns generated for each available active surface. If control circuitry determines that one or more constraints have not been fulfilled, the process 1600 moves to step 1622, where control circuitry builds or refines the customized pattern so that all the constraints are fulfilled. As an example, control circuitry may determine that a generated pattern for an active surface requires more than the number of selected colors, in which case control circuitry may run a color reduction algorithm to match the color rendering capabilities of the vehicle's color changing exterior surface. In some approaches, control circuitry reduces the resolution of the pattern and matches the specified color or pattern by dithering color on adjacent pixels. The process 1600 then continues, once again, at step 1620.

If control circuitry determines, at step 1620, that all constraints have been fulfilled, control circuitry instructs the system in charge of controlling the active paint (e.g., active car paint controller 1203, shown in FIG. 12) to apply the pattern to the color changing exterior surface of the vehicle. In some approaches, before doing so, control circuitry visualizes the resulting look of the car on the user input interface (e.g., user input interface 1201) or on a user device which is connected to the vehicle via a communications network (e.g., communications network 1301). The process 1600 continues at step 1626, where the control circuitry stores the resulting pattern in a library of color changing exterior surface patterns within a storage (e.g., storage 1210, shown in FIG. 12). In some approaches, patterns stored within the library of color changing exterior surface patterns can be activated by control circuitry without requiring any image re-processing. In some embodiments, the patterns can be shared with other users via the communications network.

In some implementations, the user specifies, via a user input interface (e.g., user input interface 1201, shown in FIG. 12), different color schemes or patterns corresponding to different segments of their journey. The color schemes or patterns can either be selected via process 1600 or from the library of color changing exterior surface patterns. In some approaches, control circuitry may access a route which takes the user to their planned destination and split the route into a variety of segments. In some embodiments, control circuitry splits the route into segments based on geofencing data. Control circuitry may present the user with the option to select a different color scheme of the color changing exterior surface for each segment of the route.

The embodiments discussed above are intended to be illustrative and not limiting. One skilled in the art would appreciate that individual aspects of the apparatus and methods discussed herein may be omitted, modified, combined, and/or rearranged without departing from the scope of the disclosure. Only the claims that follow are meant to set bounds as to what the present disclosure includes.

What is claimed is:

1. A method, comprising:
   identifying a safety event in a surrounding environment of a vehicle, wherein the vehicle comprises one or more color-changing exterior surfaces;
   selecting a selected color scheme for the one or more color-changing exterior surfaces of the vehicle in response to the identifying the safety event, wherein the selected color scheme is selected based on (a) type of the safety event, and (b) appearance of the surrounding environment;
   modifying, at a first time, one or more of the color-changing exterior surfaces of the vehicle to match the selected color scheme;
   determining a location of the vehicle while the one or more color-changing exterior surfaces of the vehicle are modified to match the selected color scheme;
   storing the location and the selected color scheme in a storage associated with the vehicle; and
   based at least in part on determining the vehicle is at the stored location at a second time:
      retrieving the selected color scheme from the storage; and
      modifying one or more of the color-changing exterior surfaces of the vehicle to match the selected color scheme retrieved from the storage.

2. The method of claim 1, wherein:
   the identifying the safety event comprises identifying there is low visibility in the surrounding environment; and
   the selecting the selected color scheme comprises selecting a color scheme that is high contrast to the surrounding environment such that visibility of the vehicle is increased against the surrounding environment.

3. The method of claim 1, wherein:
   the identifying the safety event comprises receiving a report of the vehicle being stolen; and
   the selecting the selected color scheme comprises selecting a color scheme that is high contrast to surrounding vehicles.

4. The method of claim 1, wherein:
   the identifying the safety event comprises identifying the vehicle is within a geofence around a high crime area; and
   the selecting the selected color scheme is based at least in part on identifying the vehicle is within the geofence and comprises selecting a color scheme that matches surrounding vehicles located within the geofence.

5. The method of claim 1, wherein:
   the identifying the safety event comprises identifying there is snow in the surrounding environment;
   identifying the surrounding environment comprises a feature distinct from the snow; and
   the selecting the selected color scheme comprises selecting a color scheme that is high contrast to the snow and the feature in the surrounding environment such that visibility of the vehicle is increased against the snow and the feature.

6. A method, comprising:
   identifying a safety event in a surrounding environment of a vehicle, wherein:
      the vehicle comprises one or more color-changing exterior surfaces; and
      at least a portion of surrounding vehicles each comprise one or more color-changing exterior surfaces;
   selecting a selected color scheme for the one or more color-changing exterior surfaces of the vehicle in response to the identifying the safety event, wherein the selected color scheme is selected based on (a) type of the safety event, and (b) appearance of the surrounding environment;

selecting a dependent color scheme for the one or more color-changing exterior surfaces of each of the at least a portion of surrounding vehicles in response to the identifying the safety event, wherein the dependent color scheme is based on the selected color scheme;

modifying one or more of the color-changing exterior surfaces of the vehicle to match the selected color scheme; and modifying the one or more color-changing exterior surfaces of each of the at least a portion of surrounding vehicles to match the dependent color scheme.

7. The method of claim 6, wherein the selecting the selected color scheme and the dependent color scheme comprises selecting a continuous color scheme that spans, and moves in relation to, the vehicle and the at least a portion of surrounding vehicles.

8. The method of claim 1, wherein:
the identifying the safety event comprises identifying a distance between the vehicle and a nearby vehicle is less than a proximity threshold;
the one or more of the color-changing exterior surfaces of the vehicle are modified, at the first time, from at least one of a first color or first color property to match the selected color scheme; and
the selecting the selected color scheme comprises selecting a dynamic color scheme that includes at least one of a second color or second color property that changes to at least one of a third color or third color property as the distance between the vehicle and the nearby vehicle decreases.

9. The method of claim 1, wherein:
the identifying the safety event comprises identifying the vehicle is changing a navigational property;
the one or more of the color-changing exterior surfaces of the vehicle are modified, at the first time, from at least one of a first color or first color property to match the selected color scheme; and
the selecting the selected color scheme comprises selecting a dynamic color scheme that includes at least one of a second color or second color property that changes to at least one of a third color or third color property as the vehicle changes the navigational property.

10. The method of claim 1, further comprising:
identifying a color scheme of an article of clothing;
generate an enhanced color scheme for the one or more color-changing exterior surfaces of the vehicle in response to the identifying the color scheme of the article of clothing, wherein the enhanced color scheme is generated to match the color scheme of the article of clothing and comprise at least two colors; and
modifying the one or more color-changing exterior surfaces of the vehicle to match the enhanced color scheme.

11. A system comprising:
a memory;
control circuitry configured to:
identify a safety event in a surrounding environment of a vehicle, wherein the vehicle comprises one or more color-changing exterior surfaces;
select a selected color scheme for the one or more color-changing exterior surfaces of the vehicle in response to the identifying the safety event, wherein the selected color scheme is selected based on (a) type of the safety event, and (b) appearance of the surrounding environment;

paint controller configured to:
modify, at a first time, one or more of the color-changing exterior surfaces of the vehicle to match the selected color scheme;

wherein the control circuitry further configured to:
determine a location of the vehicle while the one or more color-changing exterior surfaces of the vehicle are modified to match the selected color scheme;
store the location and the selected color scheme in the memory; and
based at least in part on determining the vehicle is at the stored location at a second time, retrieve the selected color scheme from the memory; and wherein the paint controller further configured to:
modify one or more of the color-changing exterior surfaces of the vehicle to match the selected color scheme retrieved from the memory.

12. The system of claim 11, wherein the control circuitry is configured to:
identify the safety event by identifying there is low visibility in the surrounding environment; and
select the selected color scheme by selecting a color scheme that is high contrast to the surrounding environment such that visibility of the vehicle is increased against the surrounding environment.

13. The system of claim 11, wherein the control circuitry is configured to:
identify the safety event by receiving a report of the vehicle being stolen; and
select the selected color scheme by selecting a color scheme that is high contrast to surrounding vehicles.

14. The system of claim 11, wherein the control circuitry is configured to:
identify the safety event by identifying that the vehicle is within a geofence around a high crime area; and
select the selected color scheme is based at least in part on identifying the vehicle is within the geofence and comprises selecting a color scheme that matches surrounding vehicles located within the geofence.

15. The system of claim 11, wherein:
at least a portion of surrounding vehicles each comprise one or more color-changing exterior surfaces;
wherein the control circuitry is further configured to select a dependent color scheme for the one or more color-changing exterior surfaces of each of the at least a portion of surrounding vehicles in response to the identifying the safety event, wherein the dependent color scheme is based on the selected color scheme; and
wherein the paint controller is further configured to modify the one or more color-changing exterior surfaces of each of the at least a portion of surrounding vehicles to match the dependent color scheme.

16. The system of claim 15, wherein the control circuitry is configured to select the selected color scheme and the dependent color scheme by selecting a continuous color scheme that spans, and moves in relation to, the vehicle and the at least a portion of surrounding vehicles.

17. The system of claim 11, wherein:
the control circuitry is configured to identify the safety event by identifying a distance between the vehicle and a nearby vehicle is less than a proximity threshold;
the paint controller is configured to modify, at the first time, the one or more of the color-changing exterior surfaces of the vehicle from at least one of a first color or first color property to match the selected color scheme; and the control circuitry is configured to select the selected color scheme by selecting a dynamic color scheme that includes at least one of a second color or second color property that changes to at least one of a third color or third color property as the distance between the vehicle and the nearby vehicle decreases.

18. The system of claim 11, wherein:

the control circuitry is configured to identify the safety event by identifying the vehicle is changing a navigational property;

the paint controller is configured to modify, at the first time, the one or more of the color-changing exterior surfaces of the vehicle from at least one of a first color or first color property to match the selected color scheme; and the control circuitry is configured to select the selected color scheme by selecting a dynamic color scheme that includes at least one of a second color or second color property that changes to at least one of a third color or third color property as the vehicle changes the navigational property.

19. The system of claim 11, wherein the control circuitry is further configured to:

identify a color scheme of an article of clothing;

generate an enhanced color scheme for the one or more color-changing exterior surfaces of the vehicle in response to the identifying the color scheme of the article of clothing, wherein the enhanced color scheme is generated to match the color scheme of the article of clothing and comprise at least two colors; and the paint controller is further configured to modify the one or more color-changing exterior surfaces of the vehicle to match the enhanced color scheme.

20. The method of claim 1, wherein the second time is different from the first time.

* * * * *